(12) United States Patent
Vasylyev

(10) Patent No.: US 10,908,329 B2
(45) Date of Patent: Feb. 2, 2021

(54) HIGH INCIDENCE ANGLE RETROREFLECTIVE SHEETING

(71) Applicant: Sergiy Vasylyev, Elk Grove, CA (US)

(72) Inventor: Sergiy Vasylyev, Elk Grove, CA (US)

(73) Assignee: S.V.V. TECHNOLOGY INNOVATIONS, INC., Sacramento, CA (US)

( * ) Notice: Subject to any disclaimer, the term of this patent is extended or adjusted under 35 U.S.C. 154(b) by 266 days.

(21) Appl. No.: 15/915,357

(22) Filed: Mar. 8, 2018

(65) Prior Publication Data
US 2018/0196174 A1 Jul. 12, 2018

Related U.S. Application Data

(63) Continuation of application No. 14/791,411, filed on Jul. 4, 2015, now abandoned.

(60) Provisional application No. 62/024,444, filed on Jul. 14, 2014.

(51) Int. Cl.
*G02B 5/136* (2006.01)
*G02B 5/02* (2006.01)

(52) U.S. Cl.
CPC ............ *G02B 5/136* (2013.01); *G02B 5/0231* (2013.01); *G02B 5/0284* (2013.01)

(58) Field of Classification Search
CPC .... G02B 5/021; G02B 5/0215; G02B 5/0231; G02B 5/0284; G02B 5/12; G02B 5/122; G02B 5/124; G02B 5/136
USPC ........................................ 359/542, 546, 599
See application file for complete search history.

(56) References Cited

U.S. PATENT DOCUMENTS

| | | | |
|---|---|---|---|
| 596,883 A | 1/1898 | Jacobs | |
| 3,458,245 A | 7/1969 | Stanley | |
| 3,801,183 A | 4/1974 | Sevelin et al. | |
| 3,833,285 A | 9/1974 | Heenan | |
| 3,923,378 A | 12/1975 | Heenan | |
| 3,975,083 A * | 8/1976 | Rowland | E01F 9/578 359/514 |
| 4,025,159 A | 5/1977 | McGrath | |
| 4,066,236 A | 1/1978 | Lindner | |
| 4,145,112 A | 3/1979 | Crone et al. | |
| 4,208,090 A | 6/1980 | Heenan | |
| 4,260,220 A | 4/1981 | Whitehead | |
| 4,349,598 A | 9/1982 | White | |

(Continued)

FOREIGN PATENT DOCUMENTS

EP 0548280 9/1990
EP 0250165 11/1991

(Continued)

OTHER PUBLICATIONS

3M, "3M Optical Lighting Film 2405," Product Bulletin 2405, Revision C. (Year: 2017).*

*Primary Examiner* — Nicholas R. Pasko

(57) ABSTRACT

A retroreflective sheeting which comprises a top transmissive layer including a plurality of parallel channel formed perpendicular to a surface of the layer, and a reflective bottom layer including a specular surface or a corrugated transmitting surface. The corrugated surface includes a plurality of linear prismatic elements extending perpendicular to the channels of the top layer. The top and bottom layers reflect light in orthogonal directions and act cooperatively to retroreflect incident light back toward the source, particularly at high incidence angles.

8 Claims, 21 Drawing Sheets

(56) References Cited

U.S. PATENT DOCUMENTS

| | | | |
|---|---|---|---|
| 4,615,579 A | 10/1986 | Whitehead | |
| 4,895,428 A | 1/1990 | Nelson et al. | |
| 4,906,070 A | 3/1990 | Cobb | |
| 5,272,562 A * | 12/1993 | Coderre | G02B 5/124 |
| | | | 359/529 |
| 5,415,911 A | 5/1995 | Zampa | |
| 5,481,637 A | 1/1996 | Whitehead | |
| 5,614,286 A | 3/1997 | Bacon | |
| 5,734,501 A | 3/1998 | Smith | |
| 5,777,790 A | 7/1998 | Nakajima | |
| 5,831,767 A | 11/1998 | Benson et al. | |
| 5,837,350 A | 11/1998 | Jacobs | |
| 5,880,885 A | 3/1999 | Bailey et al. | |
| 5,882,796 A | 3/1999 | Wilson et al. | |
| 5,898,523 A | 4/1999 | Smith et al. | |
| 5,910,858 A | 6/1999 | Frey et al. | |
| 5,926,314 A | 7/1999 | Smith et al. | |
| 5,930,041 A | 7/1999 | Thielman | |
| 6,015,214 A | 1/2000 | Heenan et al. | |
| 6,114,009 A | 9/2000 | Smith | |
| 6,257,860 B1 | 7/2001 | Luttrell et al. | |
| 6,282,026 B1 | 8/2001 | Dreyer et al. | |
| 6,318,867 B1 | 11/2001 | Bacon | |
| 6,452,734 B1 * | 9/2002 | Whitehead | G02B 5/045 |
| | | | 359/836 |
| 6,470,610 B1 * | 10/2002 | Northey | G02B 5/124 |
| | | | 40/582 |
| 6,503,564 B1 * | 1/2003 | Fleming | B05D 1/60 |
| | | | 427/255.6 |
| 6,508,559 B2 * | 1/2003 | Bacon, Jr. | B29C 39/148 |
| | | | 359/530 |
| 6,700,716 B2 | 3/2004 | Sejkora | |
| 6,877,866 B2 | 4/2005 | Nilsen et al. | |
| 7,070,314 B2 * | 7/2006 | Edmonds | E06B 9/24 |
| | | | 362/600 |
| 7,188,960 B2 | 3/2007 | Smith | |
| 7,195,360 B2 | 3/2007 | Bacon, Jr. et al. | |
| 7,251,079 B2 | 7/2007 | Capaldo et al. | |
| 7,252,397 B2 | 8/2007 | Harata et al. | |
| RE40,455 E | 8/2008 | Heenan et al. | |
| RE40,700 E | 4/2009 | Heenan et al. | |
| 7,513,629 B2 | 4/2009 | Couzin | |
| 8,177,374 B2 | 5/2012 | Wu | |
| 8,251,525 B2 | 8/2012 | Smith | |
| 8,419,197 B2 | 4/2013 | Smith | |
| 8,824,050 B2 | 9/2014 | Vasylyev | |
| 8,934,173 B2 | 1/2015 | Vasylyev | |
| 2004/0013856 A1 * | 1/2004 | Araki | B32B 3/30 |
| | | | 428/167 |
| 2010/0265585 A1 * | 10/2010 | Kim | G02B 5/124 |
| | | | 359/530 |
| 2012/0037025 A1 * | 2/2012 | Patel | B41M 5/0041 |
| | | | 101/483 |
| 2014/0055858 A1 | 2/2014 | Chapman | |
| 2014/0293436 A1 | 10/2014 | Nagahama et al. | |
| 2015/0362640 A1 * | 12/2015 | Buoni | G02B 5/124 |
| | | | 359/530 |
| 2016/0326798 A1 | 11/2016 | Ahdoot | |
| 2019/0346615 A1 * | 11/2019 | Johnson | G02B 6/0053 |

FOREIGN PATENT DOCUMENTS

| | | | |
|---|---|---|---|
| EP | 0356005 | 5/1994 | |
| EP | 1149316 | 12/2002 | |
| WO | WO-2007118122 A2 * | 10/2007 | G07F 7/10 |

* cited by examiner

HIGH INCIDENCE ANGLE RETROREFLECTIVE SHEETING

CROSS-REFERENCE TO RELATED APPLICATIONS

This application is a continuation of application Ser. No. 14/791,411 filed on Jul. 4, 2015, which claims priority from U.S. provisional application Ser. No. 62/024,444 filed on Jul. 14, 2014, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The present invention relates to retroreflective materials which are effective at off-axis light incidence and are particularly effective within a range of incidence angles of about 20° to about 85°. More particularly, this invention relates to retroreflective materials such as sheeting or films useful for marking surfaces which are positioned at relatively low angles with respect to light rays directed towards such surfaces.

2. Description of Background Art

Various types of optical retroreflectors used to direct light back toward the light source employ prismatic cube corner elements or tiny glass beads. Retroreflective materials are useful since they appear brightest to observers located near the light source, such as a car's driver near headlights, for example, and can be effective in a broad range of incidence or viewing angles.

However, the retroreflective properties and, hence, the apparent brightness of conventional retroreflective materials diminishes rapidly with the increase of the incidence angle. For example, the cube corner retroreflective sheeting, which provides some of the highest reflectivity of any known retroreflective sheeting, loses nearly all of its reflectivity when the incidence angle becomes greater than about 40°, which limits its use.

It is therefore an object of the present invention to provide an improved retroreflective sheeting structure that enhances retroreflectivity at high entrance angles.

Raised retroreflective elements or retroreflectors consisting of array of individually assembled retroreflective elements have been proposed which lack the utility and cost benefits of continuous retroreflective sheeting. Accordingly, practical retroreflective materials are needed that could be implemented within a compact form factor of a continuous sheet or film and which could maintain high brightness at high incidence angles. It is therefore another object of the present invention to provide an improved retroreflective structure that provides advanced retroreflectivity at high incidence angles within a sheet-form material.

The design and optical efficiency of retroreflective sheeting, while improved over the last two decades, may still be improved even further in terms of the overall light return. For example, the state-of-the-art encapsulated glass bead sheeting reflects only 14% of light back toward its source, the most common truncated cube corner sheeting reflects a maximum of about 32%, and the most advanced full-cube sheeting reflects a maximum of about 58%. It is therefore another object of the present invention to provide an improved retroreflective sheeting structure that enhances the overall light return at least for some observation and/or incidence angles.

These needs and others are met within the present invention, which provides an improved retroreflective sheeting structure for redirecting angle incident at high entrance angles, particularly achieving relatively high retroreflectivity at incidence angles above 20° and achieving superior retroreflectivity at incidence angles of about 40°-85°. The improved structure employs internal TIR surfaces and a rear reflective surface to efficiently intercept and retroreflect light towards the source. Such structure can be made thin and flexible, finding utility in various retroreflective systems such as road pavement marking, high visibility sheeting or films, light redirecting materials, light rejecting materials, and the like.

BRIEF SUMMARY OF THE INVENTION

The present invention solves problems of retroreflecting light at high incidence within a thin sheet-form structure having a top optically transmissive layer and a bottom reflective layer. The top layer includes at least one parallel array of straight and narrow channels formed within the layer's material. The channels may also be arranged in two parallel array oriented perpendicular to each other. The channels have smooth parallel surfaces which are configured to reflect light propagating through the top layer by means of a total internal reflection (TIR). The channels may be spaced according to a predefined ratio with respect to the channel depth to maximize retroreflectivity for a particular angular range. The bottom reflective layer may include a mirrored surface and may also be configured to include linear prismatic surface corrugations extending perpendicular to the channels of the top layer. Each of the corrugations should preferably be shaped in the form of an isosceles right-angle linear prism which retroreflects light at least in one plane which is perpendicular to the longitudinal axis of the prism and parallel to the linear channels of the top layer. The retroreflective sheeting may be preferably operable in an orientation in which the incident light enters the surface of the sheet-form structure at an off-normal angle and in which the channels of the top layer are perpendicular or near perpendicular to the incident light direction.

In at least one embodiment, the invention features a retroreflective sheet structure having a top layer of an optically transmissive material and a bottom reflective layer. The top layer has a plurality of channels formed within its optically transmissive material. Each channel is configured to reflect light by means of a total internal reflection. The channels can be arranged into various configurations. In one implementation, the channels are arranged into a parallel array. In one implementation, the channels are arranged into a first parallel array and a second parallel array having an orientation perpendicular to the first parallel array. In one implementation, the first and second array are disposed in a staggered arrangement.

In at least one embodiment, each of the channels is defined by a pair of opposing walls extending between opposing major surfaces of the top layer parallel to each other and perpendicular to the major surfaces.

In various implementations, the optically transmissive material of the top layer is selected from the group of polymeric materials consisting of optically clear or translucent plasticized polyvinyl chloride, thermoplastic elastomers, polyurethanes, and silicones. In further implementations, the bottom reflective layer comprises a refractive material selected from the group of consisting of glass, poly(methyl methacrylate), polycarbonate, polystyrene, rigid polyvinyl chloride, polyester, and cyclic olefin copolymer. In yet further implementations, the bottom reflective layer includes a mirrored surface.

In at least one embodiment, the bottom reflective layer comprises a linear array of isosceles prisms having substantially perpendicular sides arranged side-by-side to form a plurality of peaks and grooves, wherein the perpendicular sides of the isosceles prisms make an angle of approximately 45° with a surface plane of the bottom reflective layer. In at least one implementation, the orientation of the channels is perpendicular to the orientation of the isosceles prisms. In at least one implementation, a depth of the channels is at least 5 times greater than a height of the isosceles prisms.

In at least one embodiment, a distance between adjacent channels of formed in the top layer of the retroreflective structure is at least 6 times an average width of the channels. In at least one embodiment, a distance between adjacent channels of formed in the top layer of the retroreflective structure is at least 10 times an average width of the channels. In at least one embodiment, a depth of each said channel is at least ten times an average width of the channel. 14. In at least one embodiment, the plurality of channels is arranged into an parallel array in which the channels are spaced from each other by a distance that is greater than a depth of each channel by a factor of at least 1.2 and at most 1.8.

In at least one embodiment, the retroreflective sheet structure is formed into an elongated shape and each of the plurality of channels is aligned parallel to a longer dimension of the elongated shape. In at least one embodiment, the retroreflective sheet structure is formed into an elongated shape and each of the plurality of channels is aligned parallel to a shorter dimension of the elongated shape.

In various embodiments, the walls of the channels can have different surface roughness characteristics. In one implementation, a root mean square surface profile roughness parameter of the walls of the channels is at most about 60 nanometers at a sampling length of between 20 and 100 micrometers. In one implementation, a root mean square surface profile roughness parameter of at least a substantial portion of the surface of each of the channels is at least about 10 nanometers at a sampling length of between 20 and 100 micrometers.

In at least one embodiment, the thickness of the top layer of the retroreflective sheet structure is between 100 micrometers and 2 millimeters.

In at least one embodiment, at least one of the top and bottom layers comprises light diffusing features. In at least one embodiment, either one of said top and bottom layers has a predefined visually conspicuous color or tint.

In at least one embodiment, at least one edge of the retroreflective sheet structure is made impermeable to moisture and/or air. In at least one embodiment, the retroreflective sheet structure includes at least one layer of optically clear adhesive bonding together the top and bottom layers.

In at least one embodiment, the retroreflective sheet structure comprises a prismatic surface as a top layer. In different implementations, the top prismatic surface is formed by a plurality of linear microprisms that can have asymetric or symmetric configurations in which the sloped faces of the microprisms are configured to receive at least light rays propagating at extremely high angles with respect to a surface normal or near-parallel to a surface of the sheet structure and refract such rays towards the bottom reflective layer.

In at least one embodiment, the invention features a retroreflective material, comprising a thin, flexible film of a transparent polymeric material, comprising a structured surface on one side, a smooth surface opposite the structured surface on the other side, and a plurality of linear reflectors formed between the structured and smooth surfaces and extending generally perpendicular to the smooth surface, wherein the structured surface includes a linear array of miniature isosceles prisms having substantially perpendicular sides arranged side-by-side to form a plurality of peaks and grooves, the perpendicular sides of said prisms make an angle of approximately 45° with said smooth surface opposite said structured surface. In at least one implementation of the retroreflective material, the plurality of linear reflectors is arranged in a parallel array extending generally perpendicular to the linear array of miniature isosceles prisms.

In at least one embodiment, the invention features a retroreflective sheeting configured to retroreflect more than 60% of light incident onto the surface of the sheeting at an off-normal incidence angle.

In at least one embodiment, the invention features a retroreflective sheeting having omnidirectional retroreflective operation. In various implementations, such omnidirectional retroreflective sheeting having a plurality of areas each configured for a different azimuth acceptance angle. In one implementation, such areas are arranged into circular segments each being a rotated copy of an adjacent segment. In one implementation, the omnidirectional retroreflective sheeting further includes areas having conventional retroreflectors such as on cube corners, full-cubes or glass beads.

In at least one embodiment, the invention features a slat of a window or door blind, comprising a strip of an optically clear plastic material having a plurality of linear reflectors embedded into the clear plastic material; and a reflective layer underneath the strip, wherein each of the linear reflectors has at least one surface configured to reflect light by means of a total internal reflection. In at least one implementation, each of the linear reflectors is aligned parallel to a longitudinal dimension of the strip.

Further embodiments and elements of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus and method generally shown in the preceding figures. It will be appreciated that the apparatus and method may vary as to configuration and as to details of the parts without departing from the basic concepts as disclosed herein. Furthermore, elements represented in one embodiment as taught herein are applicable without limitation to other embodiments taught herein, and in combination with those embodiments and what is known in the art.

The present invention particularly seeks to provide retroreflective sheeting capable of redirecting light back to the source with high efficiency at off-normal incidence angles and particularly at high angles of incidence. The following embodiments of the present invention are generally directed to a retroreflective sheet material which may be configurable for light redirecting operation in response to light incident onto such material from off-normal angles and may be further configurable for maintaining a certain minimum level of retroreflectivity for relatively high entrance angles or even for the case when the incident light propagates near parallel to the surface of the material.

Figure 1:
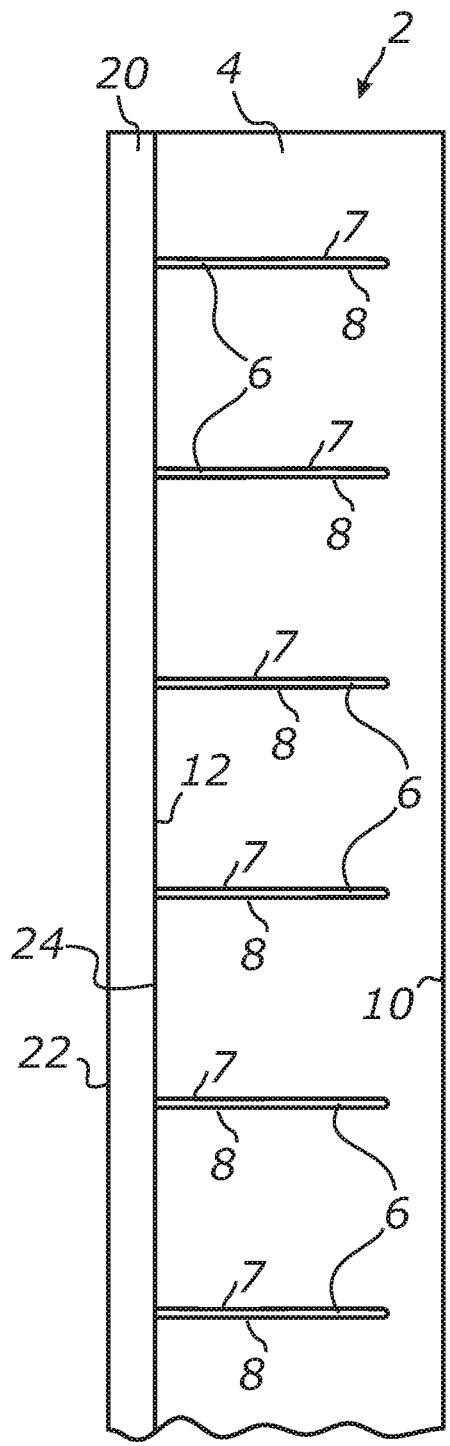
FIG. 1 is a fragmentary, schematic cross section view of a layered retroreflective sheet material, according to at least one embodiment of the present invention.

FIG. 1 illustrates a first embodiment of a retroreflective sheeting of the invention. In this embodiment, a retroreflective sheet 2 has a layered structure and is formed by an optically transmissive top layer 4 and a reflective bottom layer 20. Top layer 4 is defined by a first major surface 10 and an opposing second major surface 12 that extends parallel to surface 10. Bottom layer 20 is defined by a major surface 22 facing away from layer 4 and an opposing major surface 24 facing layer 4. Each of the layers 4 and 20 extends both longitudinally and laterally and forms a continuous sheet or sheet-form structure. Accordingly, major surfaces 22 and 10 of the respective layers 20 and 4 define opposing outer boundaries of retroreflective sheet 2.

Top layer 4 is made from an optically transmissive material and configured for light input and output to and from sheet 2. Such material should preferably be optically clear with relatively high light transmissivity so that layer 4 can effectively transmit substantially all of the light to and from layer 20.

In one embodiment, reflective layer 20 may be formed by a reflective coating deposited onto surface 12 of layer 4. In one embodiment, reflective layer 20 can be made from an opaque substrate material, such as metal or plastic, with its surface 24 being smooth and mirrored for specular reflectivity. Mirroring may be performed by any suitable means, for example, including but not limited to vacuum metallization of surface 24 or laminating a mirror film onto such surface. Alternatively, layer 20 may be made from an optically transmissive material and its reflectivity may be provided by mirroring the opposite surface 22.

The thickness of layer 4 should preferably be within a range typical for film or thin sheet materials. In one embodiment, the thickness of layer 4 may be within the range from 50 micrometers to 2 millimeters and more preferably within the range of 100 micrometers to 1 millimeter.

Layer 20 can be made rigid or flexible, depending on the application and can also be made to any desired thickness. From the practical point of view, the overall thickness of sheet 2 and its layers may be selected from the range of thicknesses that is typical to films or thin flexible sheets. In a preferred embodiment, the thickness of sheet 2 may be selected from the range between 100 micrometers and 2 millimeters which may further include any auxiliary layers such as an adhesive or protective layer.

Retroreflective sheeting can be made operable with layers 4 and 20 being detached from each other and even spaced apart by a relatively small distance. However, it at least one embodiment, it may be preferred that layer 20 is disposed as close to layer 4 as possible, end even more preferred that the layers are disposed in a close contact with each other. It is noted that many applications may require monolithic retroreflective sheeting with a good structural integrity, in which case layer 20 should be bonded, welded, laminated or otherwise attached to layer 4 with good and durable physical contact so that channels 6 are permanently encapsulated and embedded into the material of sheet 2.

Any suitable lamination and/or bonding technique may be used. For example, layers 4 and 20 may be bonded by an optically clear adhesive using roll lamination, press lamination, vacuum press lamination, encapsulation and the like. The bonding process may also include curing the adhesive layer using heat, moisture, UV light or other techniques depending on the type of adhesive used. Layers 4 and 20 may bonded together using an alternative technique which does not involve any adhesives. Examples of such bonding include but are not limited to heat welding, ultrasonic welding, radio-frequency (RF) welding, solvent welding, and the like.

Layer 4 includes an array of deep, narrow and substantially parallel channels 6 formed in its body between surfaces 10 and 12 and extending perpendicularly to such surfaces into the bulk of the material that forms layer 4. Each channel 6 has a first wall 7 and an opposing second wall 8 extending parallel to the first wall. Channels 6 should be as narrow as practically possible with spacing between walls 7 and 8 being just sufficient to prevent optical contact.

Walls 7 and 8 should also be as parallel to each other as practically possible. The parallelism of such walls should preferably be within a small predefined angular range. In one embodiment, each pair of walls 7 and 8 should be parallel within 2 degrees, more preferably within 1 degree, and even more preferably within 0.5 degree.

Each of the walls 7 and 8 should also extend into the depth of the material of layer 4 substantially perpendicular to surface 10. In one embodiment, the deviation of walls 7 and 8 from a normal to surface 10 should preferably be within 1 degree, more preferably within 0.5 degree, and even more preferably within 0.3 degrees.

The width of channel 6 is defined by the distance between the respective opposing walls 7 and 8. It is preferred that the width of each channel 6 is less than 100 micrometers, more preferred that is less than 60 micrometers, even more preferred that it is less than 40 micrometers, and even more preferred that it is less than 20 micrometers. In the extreme cases, the width of channels 6 may also be made as small as 10 micrometers or even less, such as, for example 1 to 5 micrometers. On the other hand, it may also be preferred that there is a certain minimum channel width of at least a few micrometers is maintained in order to prevent or reduce the risk of opposing walls 7 and 8 of channels 6 to close upon each other and thus create an optical contact. Channels 6 are hollow and designed to internally reflect light by means of a total reflection (TIR) which requires an optical interface between a higher-index transmissive material and air having refractive index of about 1. Accordingly, the optical contact between walls 7 and 8 is generally unwanted since it may suppress TIR.

The depth of each channel 6 should be substantially greater than its width. According to one embodiment of the present invention, the depth of each channel 6 may be at least approximately ten times the average width of the channel. By way of example and not limitation, the average width of each channel 6 may be approximately 20 micrometers and the depth of the channel may be at least 200 micrometers. In at least some embodiments, the ratio between the depth and width of channels 6 (an aspect ratio) may be advantageously selected to exceed 15 or 20 times.

On the other hand, the channel width should also be significantly less than the spacing between adjacent channels to minimize the percentage of incident light that can be intercepted by the channel ends. According to one embodiment of the present invention, a distance between adjacent channels is at least 6 times an average width of the channels, more preferably at least 8 times an average width of the channels, and more preferably at least 10 times an average width of the channels.

Each of the walls 7 and 8 should have a substantially smooth surface capable of reflecting light by means of TIR in a specular or near-specular regime while minimizing scattered light. It should be understood that the surfaces of walls 7 and 8 do not have to be absolutely smooth to provide such operation. It can be shown that walls 7 and 8 may provide good TIR reflectivity even with some non-negligible surface roughness as long as such roughness is significantly less than the wavelength. It is generally preferred that a root-mean-square (RMS) roughness parameter of the surface of walls 7 and 8 is below 0.1 micrometers (100 nanometers). According to one embodiment, the RMS surface roughness parameter should be within the range between 0.01 micrometers (10 nanometers) and 0.1 micrometers (100 nanometers), more preferably between 0.01 micrometers (10 nanometers) and 0.06 micrometers (60 nanometers), and more preferably between 0.01 micrometers (10 nanometers) and 0.03 micrometers (30 nanometers). According to one embodiment, the preferred sampling length for measuring such RMS roughness parameter can be between 20 and 100 micrometers and should not generally exceed the depth of channels 6.

According to a preferred embodiment, channels 6 should be formed in the material of layer 4 to a depth that preserves the integrity of the layer, prevents material tearing or separation at the locations of channels 6 and allows layer 4 to retain its continuous sheet form. Accordingly, it is preferred that channels 6 extend into the bulk material through only a portion of the thickness of layer 4 so that all of the channels are formed on a common substrate. At least some portion of the thickness of the material should remain uncut and at least one major surface of layer 4 should be smooth and generally uninterrupted across the entire width of sheet 2.

While forming extremely narrow, smooth-surface TIR channels with vertical walls in optically clear materials may be challenging using conventional techniques such as molding or embossing, suitable new techniques have recently been developed. By way of example, U.S. Pat. No. 8,824,050, published Sep. 2, 2014 and herein incorporated by reference in its entirety, discloses forming narrow TIR-quality channels in a soft optically clear material, such as plasticized PVC (PVC-P), using one or more ultra-sharp rotary blades. It also discloses examples of forming slits having TIR walls with RMS surface roughness between about 0.01 micrometers (10 nanometers) and 0.03 micrometers (30 nanometers). Likewise, a sheet or film of optically clear PVC-P or a similar material can be used for forming layer 4 and a finely honed rotary blade may be used to slit the material to a prescribed depth to produce channels 6 which opposing walls 7 and 8 will be capable of reflecting light by means of TIR. Since slits produced by a thin and extremely sharp rotary blade in a soft and elastic material, such as PVC-P or thermoplastic polyurethane (TPU), allow for maintaining a very small width of the formed slits and high parallelism of the opposing walls of such slits, good-quality channels 6 may be produced using such technique.

It is noted that, where a definition or use of a term in a reference, which is incorporated by reference herein is inconsistent or contrary to the definition of that term provided herein, the definition of that term provided herein applies and the definition of that term in the reference does not apply.

It is further noted that the use of PVC-P material (also frequently referred to as plasticized PVC, flexible PVC or simply vinyl) for sheet 4 and the use of surface slitting technique for forming channels 6 are not prescriptive and are described here by way of non-limiting examples. Other materials that may potentially be suitable for slitting and producing narrow TIR channels 6 include but are not limited to optically clear or translucent thermoplastic elastomers, optically clear or translucent polyurethanes, including TPU, and optically clear or translucent silicones. Furthermore, other types of optically transmissive materials can be used with an appropriate technique of forming channels 6 with the described properties. Such materials may include but are not limited to glass, poly(methyl methacrylate) (PMMA, acrylic), polycarbonate, polystyrene, rigid polyvinyl chloride, butyrate, polyester, and cyclic olefin copolymer.

It is essential that each channel 6 forms a highly efficient reflector embedded into the material of layer 4 and extending generally perpendicular to the layer's surface. While the technique of slitting may be preferred for making deep and narrow channels 6 in certain soft materials, such as PVC-P or TPU, it may also be possible that the certain techniques related to micro- and nano-texturing, such as hot embossing, molding, imprinting, UV-curable embossing, etching, and the like, can be adapted for producing the described structure of layer 4 in rigid materials such as PMMA, PET, clear epoxies or polycarbonate.

Figure 2:
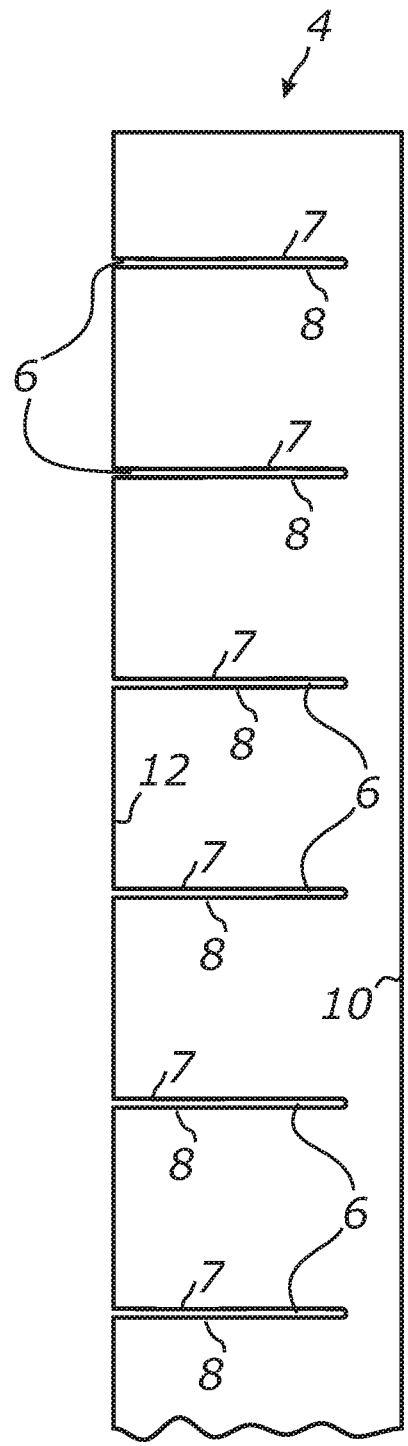
FIG. 2 is a fragmentary, schematic cross section view of a top layer of a retroreflective sheet material, according to at least one embodiment of the present invention.

FIG. 2 depicts layer 4 without layer 20 attached to it and shows that high-aspect-ratio channels 6 may be formed in surface 12 without disrupting the overall planarity and smoothness of such surface. The channels may extend only partially into the material of layer 4 so that the opposite surface 10 may be left uninterrupted. It will be appreciated that when such layer 4 is subsequently co-laminated with layer 20 to form sheet 2, channels 6 will become fully enclosed with their forming TIR surfaces embedded into the final retroreflective structure. Such encapsulation may be advantageous for protecting channels 6 and surfaces of walls 7 and 8 from the environment and for providing dimensional stability of the embedded TIR reflectors. An additional benefit of such encapsulation can be the prevention of closing the walls of channels 6 upon themselves.

Figure 3:
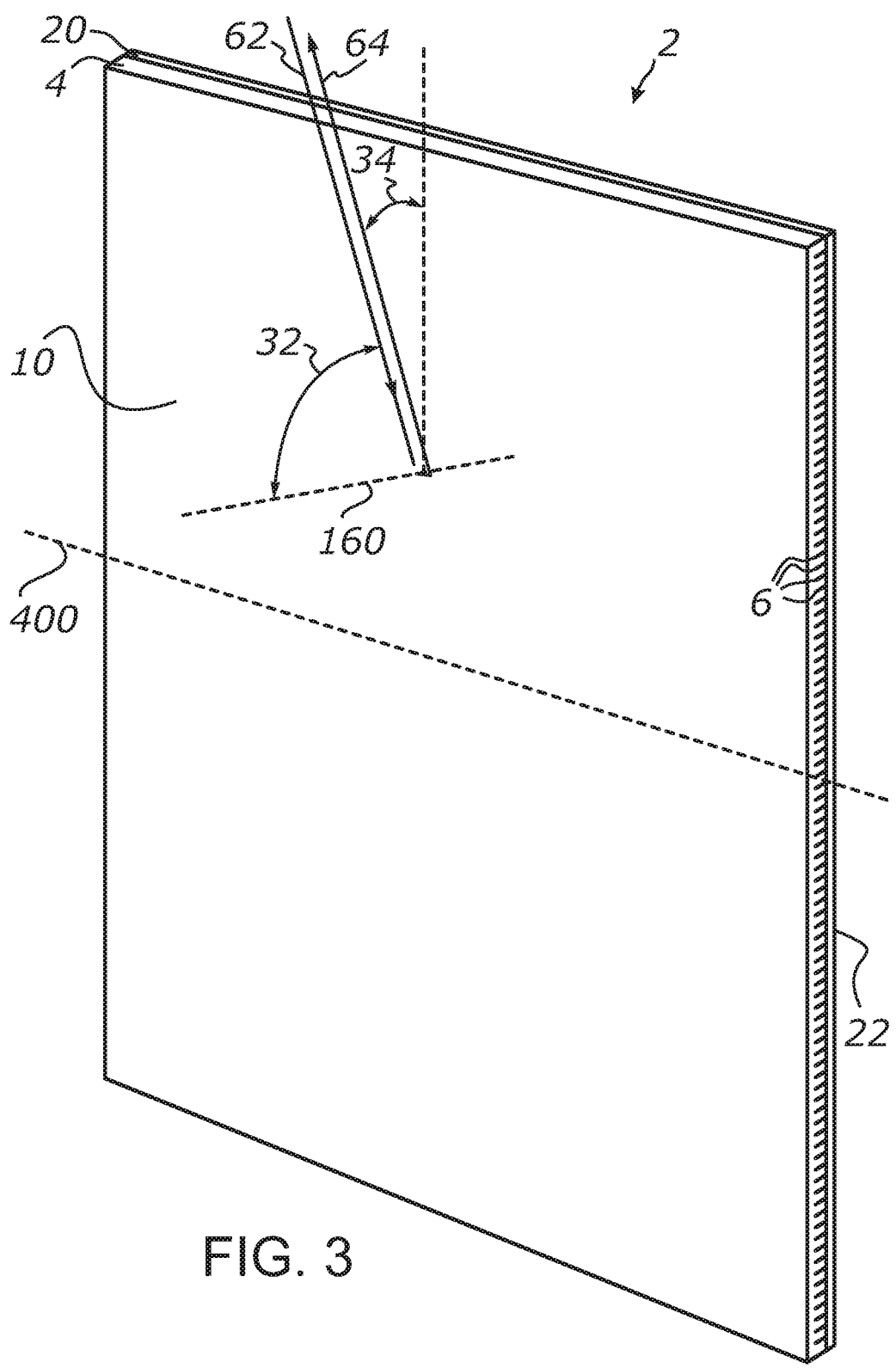
FIG. 3 is a schematic perspective view of a retroreflective sheet, according to at least one embodiment of the present invention.

FIG. 3 shows rectangularly shaped sheet 2 and illustrates its retroreflective operation. Linear channels 6 of layer 4 are arranged into a parallel array and extend parallel to a reference line 400 which, in turn, is parallel to a pair of opposing edges of the rectangular sheet. In one embodiment, reference line 400 is parallel to a longer major dimension of rectangular sheet 2. In one embodiment, reference line 400 is parallel to a shorter major dimension of rectangular sheet 2.

While sheet 2 of FIG. 3 is shown having a generally planar appearance, it should be understood that such sheet can be made flexible and bendable to any shape. Alternatively, sheet 2 may also be made rigid to maintain such planar shape or any other prescribed shape depending on the application. One or more edges of sheet 2 may be sealed using an air and/or moisture impermeable encapsulating resin or tape. Such sealing or encapsulation may be useful for preventing the delamination of the layers, and/or preventing the moisture ingress or contamination of channels 6 with dust or dir through the edges. In one embodiment, the entire perimeter of sheet 2 may be sealed. In a further embodiment, the entire sheet 2 may be encapsulated within another material or structure or overmolded with a clear plastic material.

A preferred orientation of sheet 2 with respect to a light source and the viewer is such that light rays should enter sheet 2 at a relatively high off-normal incidence angle and also propagate along a direction perpendicular to reference line 400. In other words, since line 400 defines the alignment of parallel channels 6, light rays should enter sheet 2 perpendicular or near-perpendicular to the longitudinal orientation of channels 6. In the context of the present invention, the term "off-normal" is meant to characterize light rays having substantially non-zero incidence angles with respect to a surface normal, in contrast to "normal" rays having incidence angles equal to or substantially close to zero with respect to the surface normal.

In operation, an incident light ray 62 emanated by a distant source strikes surface 10 of the top layer 4 at an incidence angle 32. The incidence angle is defined as an angle that the incident ray makes with a normal to the surface at the point of incidence. Referring to FIG. 2, ray 62 makes incidence angle with respect to a normal 160. Ray 62 also makes an angle 34 with surface 10 of sheet 2 at the point of incidence. It will be appreciated that angle 32 and 34 are complementary.

Ray 62 is internally redirected and retroreflected by sheet 2 and forms a retroreflected ray 64 upon the exit from surface 10. The retroreflected ray 64 emerges at the same angle with respect to surface 10 as the angle of incidence 32 and propagates generally back towards the source.

Figure 4:
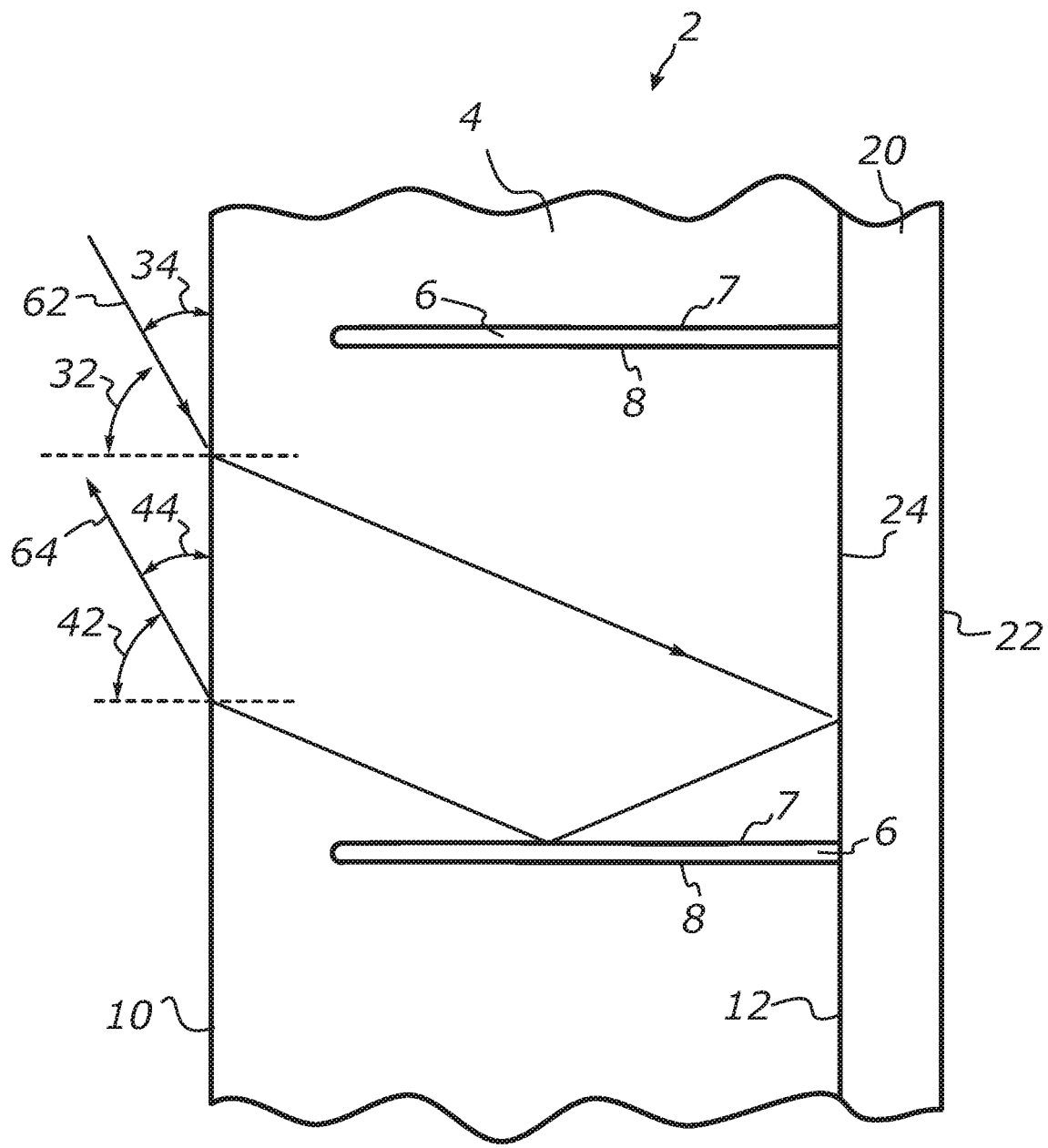
FIG. 4 is a fragmentary, schematic cross section view and raytracing of a retroreflective sheet material, showing a retroreflective operation, according to at least one embodiment of the present invention.

The retroreflective operation of sheet 2 is further explained in reference to FIG. 4 which shows a fragmentary schematic cross section of sheet 2 with the plane of the drawing being generally perpendicular to reference line 400 of FIG. 3 and thus also perpendicular to the longitudinal axis of channels 6. Surface 24 of reflective layer 20 in FIG. 4 is mirrored for high specular reflectivity. Incident ray 62 striking the light input surface 10 at incidence angle 32 refracts into the material of layer 4 and propagates in this layer between a pair of adjacent parallel channels 6. Upon reaching the opposite surface 12 of layer 4, ray 62 reflects from reflective layer 20 by means of a specular reflection and further reflects from wall 7 of channel 6 by means of TIR. As a matter of optics, the reflection angle for both specular reflection and TIR is the same as the angle of incidence. Since wall 7 is perpendicular to the reflective surface of layer 20, ray 62 is further propagated parallel to the original propagation direction after the two consecutive reflections from reflective layer 20 and wall 7 and forms retroreflected ray 64 upon the exit from surface 10 which propagates back toward the source. An emergence angle 42 that retroreflected ray 64 forms with a normal to surface 10 is equal to the incidence angle 32 of incident ray 62 and a complementary angle 44 is thus equal to angle 34. Accordingly, the retroreflective structure of sheet 2 shown in FIG. 4 retroreflects light at least in a plane which is perpendicular to the longitudinal axis of linear channels 6.

It is noted that the light path of rays 62 and 64 of FIG. 4 is reversible. In other words, depending on the point of incidence into surface 10, ray 62 may undergo a first reflection from wall 7 of the respective channel 6 and then undergo a second reflection from reflective layer 20. This is illustrated in FIG. 5 which shows that the retroreflected ray 64 may be directed back toward the source regardless of the point of entry onto sheet 2.

Figure 5:
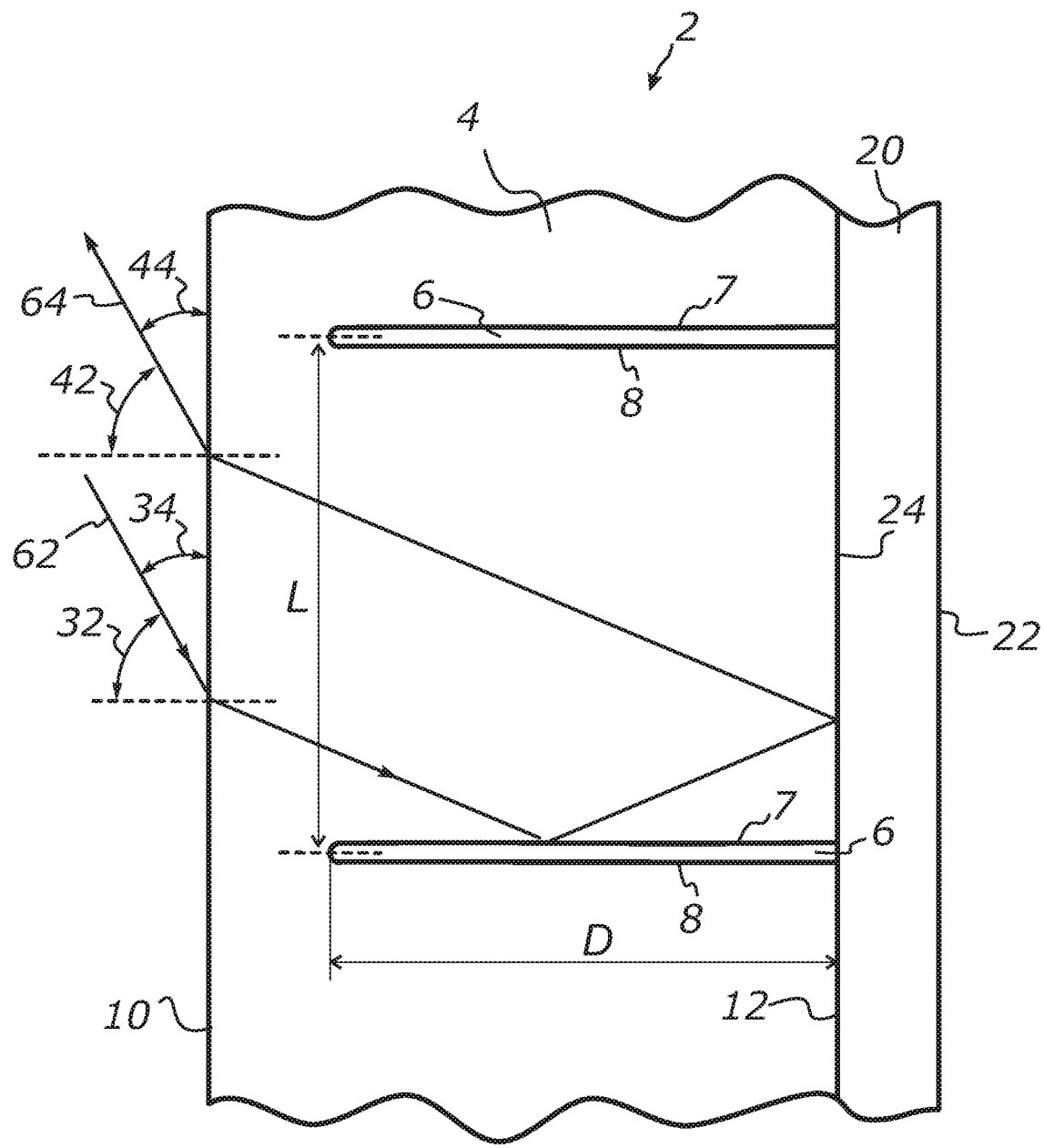
FIG. 5 is a fragmentary, schematic cross section view and raytracing of a retroreflective sheet material, showing a retroreflective operation with a reverse path of a light ray, according to at least one embodiment of the present invention.

Referring further to FIG. 4 and FIG. 5, the parallel array of linear channels 6 of layer 4 and mirrored surface 24 of layer 20 form a linear array of long and narrow retroreflective cells each shaped as a rectangular prism with a right-angle reflection geometry. More specifically, an individual retroreflective cell is defined by a pair of adjacent walls 7 and 8 together with the respective portion of mirrored surface 24 disposed between such walls.

Referring to FIG. 5, the spacing of channels 6 may be characterized by a distance L between adjacent channels in a plane perpendicular to the longitudinal axis of the channels. A depth D of channels 6 may be defined as the distance from a base to a tip of the respective channel.

According to one embodiment, it is preferred that the L/D ratio is generally greater than 1 and less than 2. In other words, the distance L between adjacent channels should be greater than the depth D of such channels but less than twice the depth D. More specifically, the maximum practical L/D ratio may also be defined based on the refractive index of the material of layer 4 in which channels 6 are formed. In one embodiment, it may be defined as follows:

$$\frac{L}{D} < \frac{2}{\sqrt{n^2 - 1}},$$

where n is the refractive index of the material of layer 4. For example, if the refractive index of the material of layer 4 is 1.51, the L/D ratio should be at most around 1.8. In one embodiment, the L/D ratio should be approximately (within a 20% error) equal to 1.5 (the distance between adjacent channels being greater than the channel depth by a factor of at least 1.2 and at most 1.8).

It may be appreciated that the combination of planar mirrored surface 24 and TIR walls 7 and 8 ensures retroreflectivity only in one angular dimension which is perpendicular to the common longitudinal axis of parallel channels 6. It may further be appreciated that, in an orthogonal angular dimension, such structure may have substantially no retroreflective properties. Accordingly, a light ray propagating in a plane which is parallel to the common axis of linear channels 6 may simply be reflected by sheet 2 without redirecting back to the source.

Figure 6:
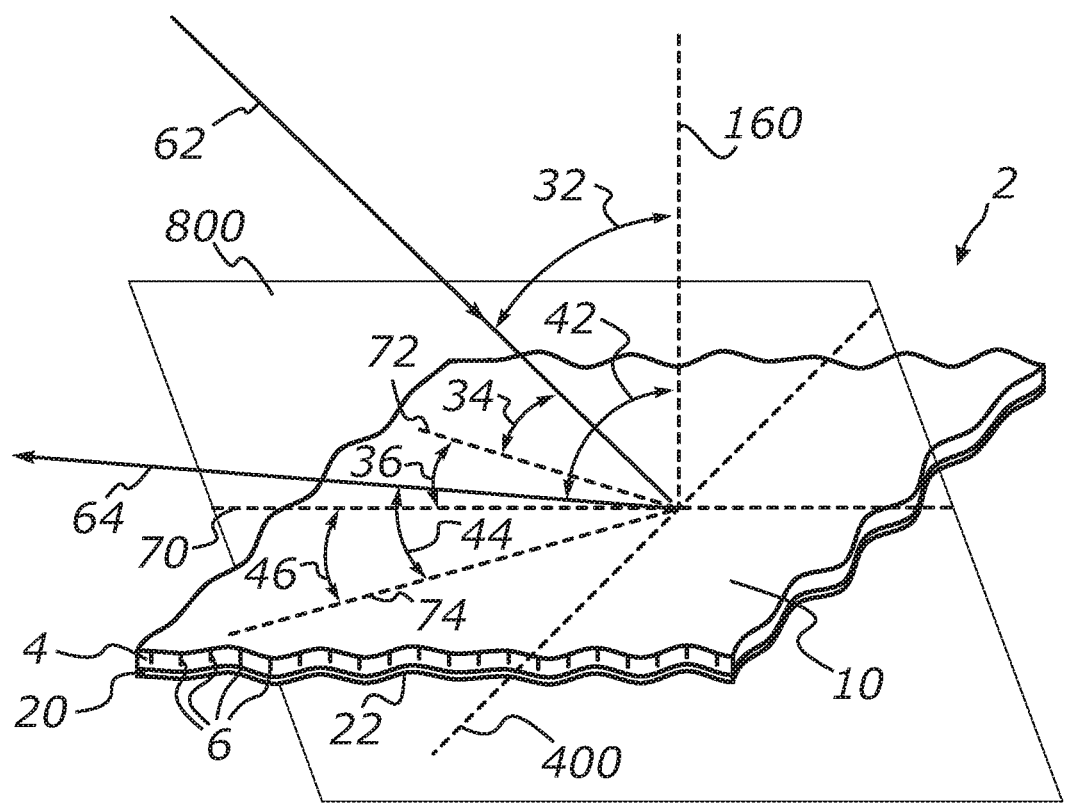
FIG. 6 is a fragmentary, schematic perspective view and raytracing of a retroreflective sheet material, showing a retroreflective operation of the material at least in one plane, according to at least one embodiment of the present invention.

This is illustrated in FIG. 6 which shows further aspects on light redirection operation of sheet 2 which layer 20 has a planar, specularly reflective surface. Referring to FIG. 6, ray 62 enters surface 10 of sheet 2 from an off-normal direction and makes incidence angle 32 with respect to normal 160 at the point of entry. A plane of incidence of ray 62 is defined as the plane that encompasses the propagation vector of ray 62 upon the incidence onto surface 10 and surface normal 160. A reference line 72 indicates the projection of incident ray 62 onto surface 10. Ray 62 makes angle 34 with the prevailing plane of surface 10 and with reference line 72. Ray 34 is complementary to incidence angle 32.

A primary retroreflection plane 800 is defined as the plane which is perpendicular to reference line 400 (perpendicular to linear channels 6). Since light rays entering onto sheet 2 in plane 800 may be retroreflected exactly towards the source, it may be preferred that the orientation of sheet 2 is such that the actual incidence plane and the preferred incidence plane coincide or otherwise parallel to each other. A reference line 70 indicates an imaginary line at which plane 800 and sheet 2 intersect.

Retroreflected ray 64 makes emergence angle 42 with respect to surface normal 160 and forms angle 44 with respect to surface 10. A reference line 74 indicates the projection of ray 64 onto surface 10 so that angle 44 is also the angle between ray 64 and reference line 74.

In the illustrated example, the incidence plane does not coincide with primary retroreflection plane 800 and make an angle 36 with respect to plane 800. Accordingly, while retroreflected ray 64 makes the same angle with respect to normal 160 as the incident ray 62 (the emergence angle equals to the angle of incidence) it is not pointed exactly back towards the source as it emerges at a different azimuth angle (turning angle with respect to normal 160). As it will be understood from FIG. 6, the plane of emergence of ray 64 and plane 800 make an angle 46 with respect to each other. The total azimuthal turn angle of retroreflected ray 64 with respect to ray 62 is the sum of angles 36 and 46.

It can be shown that at the planar geometry of the reflective surface of layer 20, angle 46 will be equal to angle 36. Accordingly, the deviation of ray 64 from the direction to the light source will be twice the misalignment angle 36 of sheet 2 from the "ideal" orientation in which linear channels 6 would be perpendicular to the source direction. In other words, retroreflective sheet 2 employing a planar mirrored surface in layer 20 can be configured to retroreflect light in a first angular dimension, such as an elevation angle, and reflect like a mirror in a second angular dimension, such as an azimuth angle, which is orthogonal to the first angular dimension. The respective azimuth/elevation angular coordinate system may be defined, for example, as follows: the coordinate system origin is located at the point of entry of ray 62 onto surface 10, the azimuth angle is a ±180° rotational angle with respect to normal 160 with a zero-point in the plane of incidence, and the elevation angle is an 0°-90° angle with respect to the plane of surface 10.

While retroreflecting light in a single angular dimension (such as an elevation angle) may find utility in many applications, at least some application will benefit from a full retroreflectivity in both angular dimensions (e.g., elevation and azimuth) so that the retroreflected rays could be directed back towards the source even when sheet 2 is not oriented with its channels 6 being perpendicular to the source direction.

Figure 7:
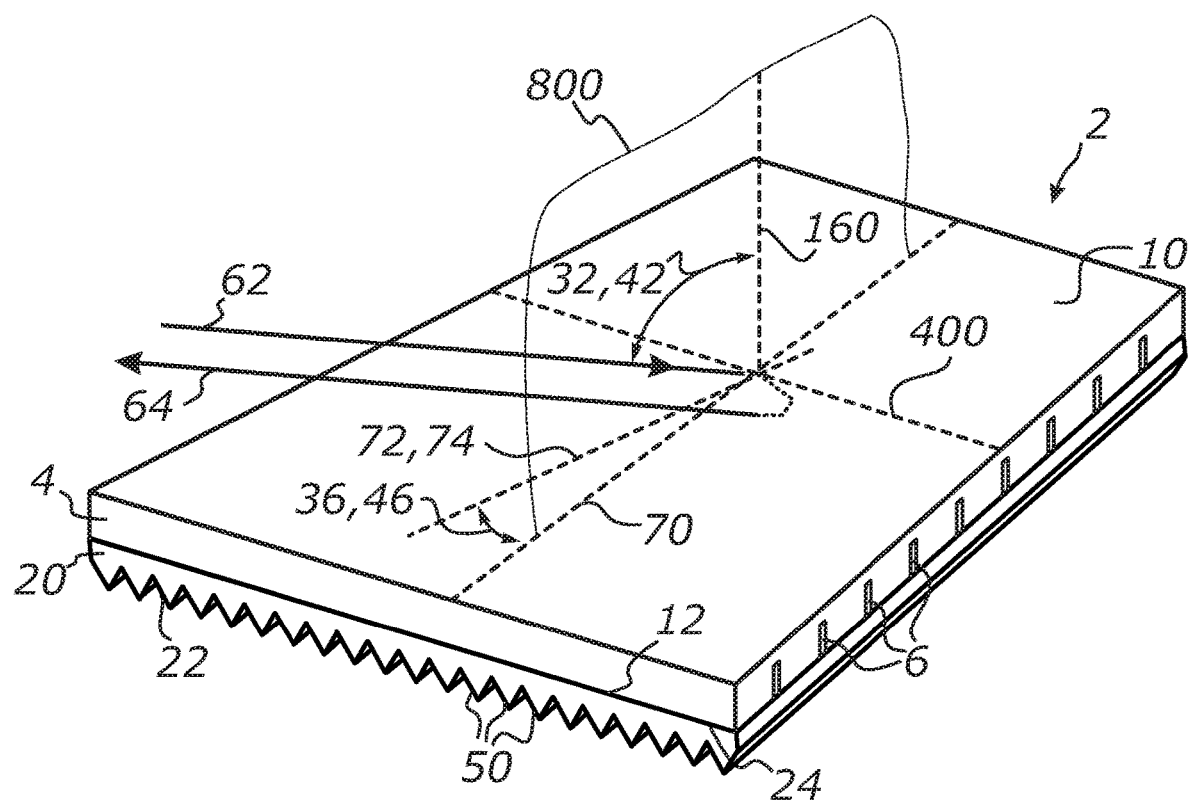
FIG. 7 is a schematic perspective view of a retroreflective sheet configured for retroreflecting light in orthogonal angular dimensions, according to at least one embodiment of the present invention.

An embodiment of sheet 2 configured to retroreflect light towards the source in a broad range of orientations of the sheet with respect to the source direction in both orthogonal angular dimensions is shown in FIG. 7.

Referring to FIG. 7, reflective layer 20 of sheet 2 is formed from an optically transmissive material and includes a parallel array of linear prismatic elements 50 formed in surface 22. Each prismatic element 50 includes two planar faces which are perpendicular to each other and form dihedral angles of approximately 45° with respect to the prevailing plane of surface 22. In a cross section, each prismatic element 50 has an isosceles right-angle triangular shape in which the sides corresponding to the planar faces intersect at about 90° and each make an angle of 45° with respect to the base of the triangle. Each of the linear prismatic elements 50 extends perpendicularly to linear channels 6. Since channels 6 and prismatic elements 50 are formed in different layers of sheet 2, the respective perpendicular arrays of channels 6 and elements 50 are stacked on top of one another and do not physically intersect.

It is generally preferred that the height of prismatic elements 50 is considerably less than the depth of channels 6. In one embodiment, it is preferred that the height of prismatic elements 50 is less than the depth of channels 6 by at least a factor of two, more preferred by a factor of five or more, and even more preferred by a factor of ten or more. One advantage of such configuration may be that the effective depth of the retroreflective cells formed by pairs of adjacent channels 6 can be kept at approximately constant depth. Another advantage may be that by making prismatic elements 50 considerably smaller, possible light leakage into an adjacent retroreflective cell can be reduced or virtually eliminated. It may also be preferred that the thickness of layer 20 is substantially less than the thickness of layer 4 and, even more preferably, considerably less than the depth of channels 6. In one embodiment, the height of prismatic elements 50 is between 20 and 100 micrometers and the depth of channels 6 is at least 200 micrometers.

Suitable materials for such microstructured layer 20 may include but are not limited to glass, acrylic (PMMA), polycarbonate, polyurethane, polyester, certain optically clear epoxies, and the like. Prismatic elements 50 may be formed from the same or a different material than the main body of layer 20. By way of example and not limitation, miniature prismatic elements 50 can be formed from polycarbonate or PMMA on a polyester film substrate.

Layer 20 may conventionally have the same or similar structure as optical lighting films utilized to transport light, as illustrated in U.S. Pat. No. 4,260,220 to Whitehead, herein incorporated by reference in its entirety. Such films are made of flexible polymeric sheets of a transparent material having a structured prismatic surface on one side and a smooth surface on the opposite side. The structured surface includes a linear array of miniature substantially right angled isosceles prisms which are arranged side-by-side to form a plurality of peaks and grooves. The perpendicular sides of the prisms make an angle of approximately 45 degrees with the smooth surface. The structure of such films enables light entering the smooth side to be reflected by the structured side as long as the angle by which the light rays deviate from the longitudinal axis of the microprisms does not exceed a certain maximum angle, which depends upon the refractive index of the film material.

In a further non-limiting example, layer 20 may comprise Brightness Enhancement Film ("BEF") or Optical Lighting Film ("OLF") available from 3M Corporation, both of which having linear, right-angle prismatic surface structures.

It will be appreciated by those skilled in the art that the right-angle prismatic structures 50 can make surface 22 reflective for rays entering onto the smooth surface 24 of layer 20 in a broad range of propagation angles. In particular, such prismatic structures can reflect light by means of TIR from the respective planar faces when the incidence angle is within a certain acceptance angle from a surface normal. The acceptance angle of such reflection varies depending on the orientation of the incidence ray with respect to the surface plane and to the longitudinal axis of prismatic elements 50.

An advantage of employing prismatic elements 50 is that, in addition to providing reflective properties for surface 22, each of such elements retroreflects light in a second plane which is perpendicular to its longitudinal axis thus complementing the single-plane retroreflection of the top layer 4.

In operation, referring further to FIG. 7, channels 6 and prismatic elements 50 work cooperatively to retroreflect incident ray 62 back towards the source, as indicated by the propagation path of retroreflected ray 64 which emerges parallel or near parallel to the incident ray. It is noted that such "full-angle" or "dual-axis" retroreflection occurs despite the incidence plane of ray 62 is not parallel to either channels 6 or prismatic elements 50. In this case, angle 36 characterizing the azimuth deviation of incident ray 62 from primary retroreflection plane 800 is still equal to angle 46 that characterizes the respective azimuth deviation of retroreflected ray 64. However, unlike the structure of FIG. 6, the retroreflected ray 64 of FIG. 7 is deflected into the same hemisphere with respect to plane 800 as the incident ray 62. Accordingly, with the elevation angle of retroreflected ray 64 being the same as that of incident ray 62 (angles that are complementary to the incidence angle 32 and the emergence angle 42, respectively) and the azimuth turn angle of retroreflected ray 64 with respect to normal 160 and the source direction being also the same as that of ray 62, the incident light undergoes a full bidirectional retroreflection in sheet 2 and is directed back towards the source.

Figure 8:
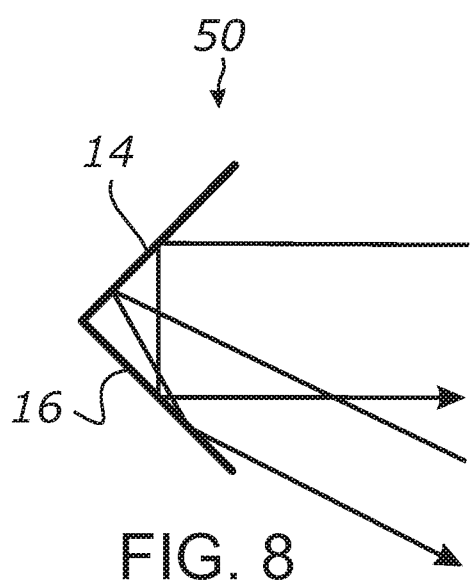
FIG. 8 is a schematic cross section view and raytracing of an individual linear prismatic element, showing a retroreflective operation in a cross-sectional plane, according to at least one embodiment of the present invention.
Figure 9:
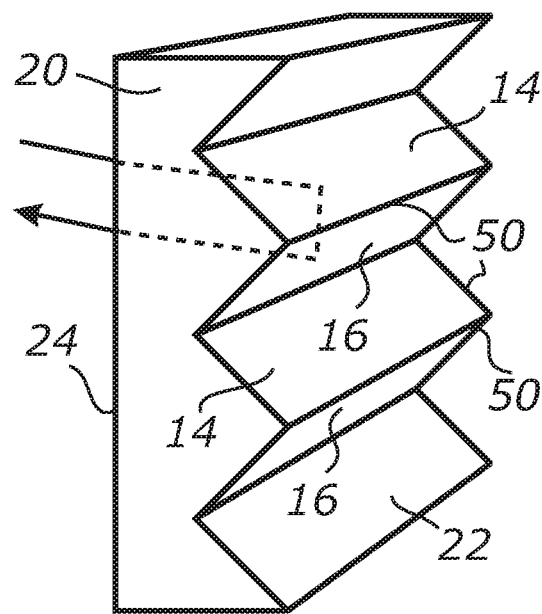
FIG. 9 is a fragmentary, schematic perspective view of a reflective layer including a plurality of linear prismatic elements, according to at least one embodiment of the present invention.

The operating principle of retroreflecting light by sheet 2 in the azimuthal angular dimension will now be further explained. FIG. 8 schematically shows a transversal cross section of individual prismatic element 50 in a plane perpendicular to the longitudinal axis of such prismatic element. Prismatic element 50 includes a first planar face 14 and an adjacent second planar face 16 which is perpendicular to face 14. Light rays are respectively shown in a projection onto a plane of the transversal cross section of prismatic element 50. It will be appreciated that TIR is virtually lossless provided the faces 14 and 16 are sufficiently smooth. Accordingly, those light rays entering the light receiving aperture of prismatic element 50 for which the TIR condition is met at both faces 14 and 16 can be losslessly reflected by the respective faces and reversed into retroreflected rays propagating parallel to the incident rays in such projection. As it is further illustrated in FIG. 8, various light rays incident at different angles within a certain acceptance angle are retroreflected towards the respective incident directions In FIG. 9, showing a portion of prismatic reflective layer 20, multiple linear prismatic elements 50 are disposed adjacently to each other and form a continuous corrugated surface 22 which has retroreflective properties at least in a plane perpendicular to the longitudinal axis of the prismatic corrugations.

Turning now back to FIG. 7, the bi-directional retroreflectivity at off-normal incidence angles is achieved due to the triple reflection of light rays in sheet 2 at right-angle reflection geometry: one reflection from a wall of channel 6 and two more reflections from the planar perpendicular faces of prismatic elements 50. Each of the reflection occurs by means of lossless TIR which ensures very high overall reflection efficiency.

Since walls 7 and 8 are perpendicular to each other and to channels 6, incident ray 62 undergoes three consecutive reflections from mutually orthogonal TIR surfaces in sheet 2 and is therefore retroreflected in a fashion which is somewhat similar to that of a truncated-cube or full-cube corner retroreflector. However, it should be understood that the retroreflector structure and the orientation of TIR surfaces in sheet 2 are different from the traditional cube corner retroreflectors and configured in favor of the relatively high off-axis incidence angles. It may be appreciated that such configuration of sheet 2 virtually eliminates the "dead" areas for such incidence angles.

Figure 10:
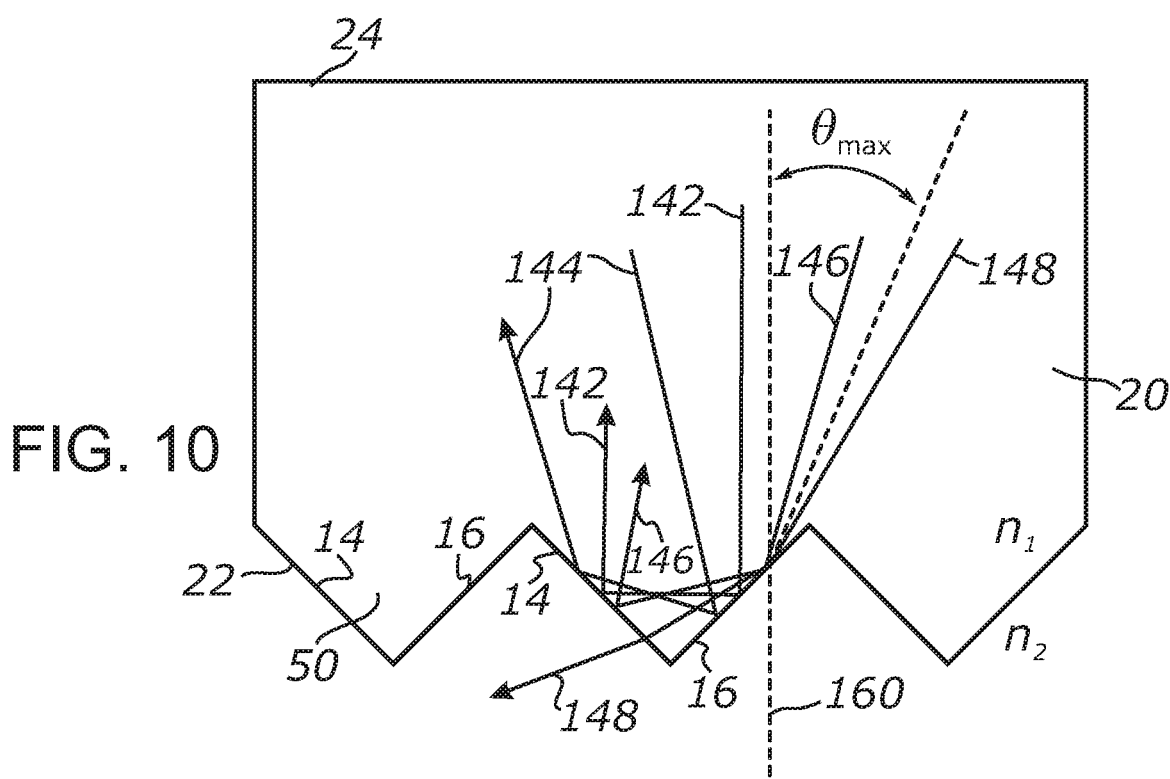
FIG. 10 is a fragmentary, schematic cross section view and raytracing of a reflective layer including a plurality of linear prismatic elements, according to at least one embodiment of the present invention.

Referring to FIG. 10, the angle by which any ray deviates from normal 160 in a cross-section perpendicular to the longitudinal axis of prismatic elements 50 must be less than a predetermined maximum angle $\theta_{max}$ to prevent light incidence onto the prismatic faces at angles that are greater than the critical TIR angle. Accordingly, a normal-incidence light ray 142 and off-normal rays 144 and 146 propagating in layer 20 at angles below $\theta_{max}$ with respect to normal 160 are retroreflected while an extreme off-normal ray 148 exits from surface 22 after reflecting from one of the faces 16 and striking an opposing face 14 at a below-TIR incidence angle.

It may be appreciated that the least favorable conditions for TIR operation of surface 22 is when the incidence plane of an incident light ray is perpendicular to the longitudinal axis of linear prismatic elements 50 (perpendicular to reference line 70 in FIG. 7). At such incidence and prismatic elements 50 having right-angle isosceles configuration, it can be shown that the maximum angle $\theta_{max}$ can be found from the following relationship: $\theta_{max}=45°-\phi_{TIR}$, where $\phi_{TIR}$ is a critical angle of (TIR) that characterizes an optical interface between the material of layer 20 and the outside medium. The critical TIR angle $\phi_{TIR}$ is defined by the refractive properties of the material and may be found from the following expression: $\phi_{TIR}$ arcsin $(n_2/n_1 \cdot \sin 90°$=arcsin $(n_2/n_1)$, where $n_1$ and $n_2$ are the refractive indices of the material of layer 20 and the outside medium, respectively. In an exemplary case of the interface between PMMA with the refractive index $n_1$ of about 1.49 and air with $n_2$ of about 1, $\phi_{TIR}$ is approximately equal to 42°.

Accordingly, if the surrounding medium is air, then $$\theta_{max} = 45° - \arcsin\left(\frac{1}{n_1}\right),$$

which gives approximately 3° in case of acrylic (PMMA) material and about 6° for polycarbonate (PC). It can be shown that the 3° and about 6° propagation angles within layer 20 correspond to the outside incidence angles of approximately 4° and 9° for PMMA and PC, respectively. Obviously, $\theta_{max}$ will be higher for a higher refractive index of the material of layer 20.

As a matter of optics, light rays may deviate from the surface normal by any angle in a plane that is parallel to the longitudinal axis of prismatic elements 50 with no adverse effect on TIR operation. Moreover, $\theta_{max}$ increases with the increase of the incidence angle in this plane. Accordingly, the acceptance angle of sheet 2 having prismatic bottom layer 20 can be significantly increased by operating sheet 2 at relatively high incidence angles and especially at grazing incidence of light onto surface 10.

Figure 11:
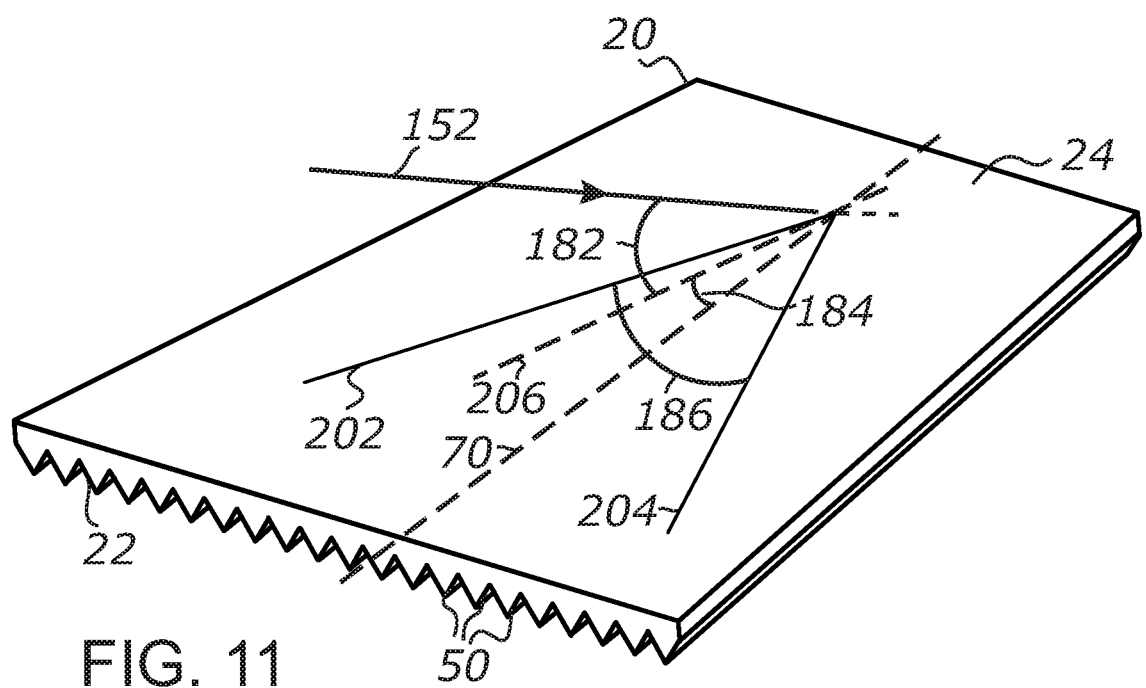
FIG. 11 is a schematic perspective view of a reflective layer portion, showing a light ray entering a smooth surface of the layer at an off-normal angle, according to at least one embodiment of the present invention.

In determining the angular limits of retroreflective operation of the retroreflective sheet material of the present invention, the path of a ray entering layer 20 via surface 24 can be considered. In FIG. 11, showing a planar portion of layer 20 having corrugated prismatic surface 22 and opposing smooth surface 24, an incident ray 152 makes an angle 182 with surface 24 in a plane perpendicular to the prevailing plane of layer 20. Angle 182 is also an angle between ray 152 and a ray projection 206 onto surface 24. In conjunction with ray 152 and surface 24, an angle 184 can be defined as the angle between projection 206 of ray 152 and longitudinal axis 70 of linear prismatic elements 50 in the plane of surface 24. Accordingly, an acceptance angle 186 may be defined as the angle of the cone which limits the angular deviation of incident rays from axis 70 for which the requirement of light reflection by layer 20 can still be satisfied. In other words, acceptance angle 186 is defined by the uttermost ray paths 202 and 204 in the plane of surface 24.

When no TIR reflection by surface 22 occurs, the incident light received by surface 24 will be transmitted by layer 20. When surface 24 is contacting with air or vacuum and $n_1$ is the refractive index of layer 20, it can be shown that acceptance angle 186 can be found from the following expression:

$$2\cos^{-1}\sqrt{1-(n_1^2-1)\frac{2-\sqrt{2}}{2+\sqrt{2}}}.$$

For layer 20 layer made from acrylic ($n_1$=1.49), angle 186 is about 54.5° (±27.2° half-angle). For polycarbonate ($n_1$=1.58), angle 186 is about 60° (±30° half-angle).

While such acceptance angle 186 may suit many applications, it may nevertheless be increased even further, for example, by providing a higher refractive index material for layer 20 or by mirroring prismatic elements 50. In one embodiment, at least a portion of the microprosmatic surface 22 of layer 20 may be mirrored with a reflective coating so that faces 14 and 16 will remain reflective even when the TIR condition is not met. Prismatic elements 50 may be metalized, for example, with an aluminum or silver layer using a vacuum deposition method.

Sheet 2 can be attached to any suitable substrate which can have any suitable thickness, including film thicknesses. Suitable substrate materials include but are not limited to wood, glass, fabric, metal or plastic sheeting, plastic films, and various composite laminates. An adhesive layer also can be disposed behind the bottom layer 20 to secure sheet 2 to a substrate. When layer 20 includes non-metalized microprismatic corrugations, such as prismatic elements 50, creating air pockets between prism surfaces and the adhesive/substrate may be required to maintain TIR reflectivity. To achieve this, an intermediate support film or a mesh material may also be provided between layer 20 and the adhesive/substrate. The support film may also be permanently attached to layer 20 by ultrasonic welding in a plurality of locations distributed over surface 22. Since welding may melt, destroy or distort microprismatic surface corrugations and suppress TIR, the cumulative area of the weld seams should be relatively small compared to the area of layer 20 so that the overall retroreflective operation of sheet 2 is not significantly impaired.

Figure 12:
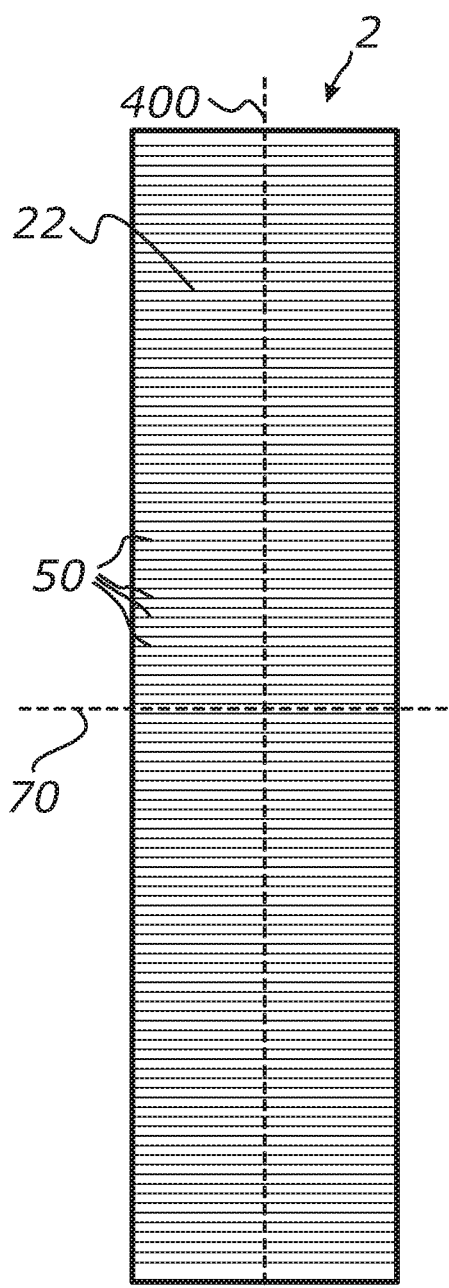
FIG. 12 is a schematic bottom view of retroreflective sheet shaped in the form of a strip, showing linear prismatic elements expending perpendicular to a longitudinal axis of the strip, according to at least one embodiment of the present invention.
Figure 13:
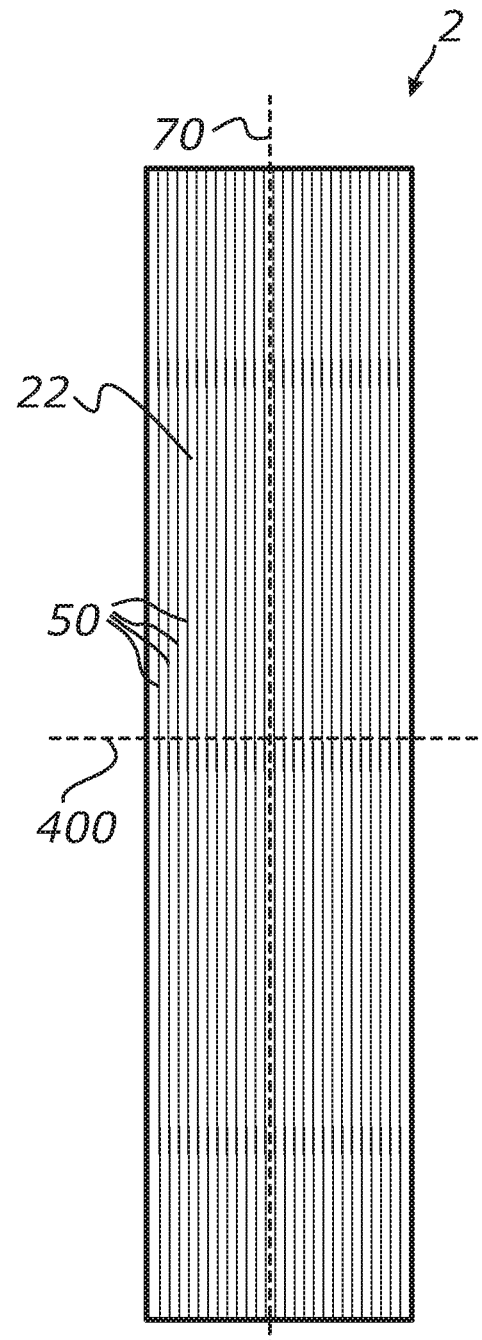
FIG. 13 is a schematic bottom view of retroreflective sheet shaped in the form of a strip, showing linear prismatic elements expending parallel to a longitudinal axis of the strip, according to at least one embodiment of the present invention.

The retroreflective material of this invention can be made in the form of large format sheets or a continuous roll and then cut to any suitable dimensions or shape. The dimensions of retroreflective sheet 2 may vary in a broad range. Particularly, the retroreflective material of sheet 2 can be cut into strips of any suitable length, width and aspect ratio. Depending on the application, the longer and shorter dimensions of such strips can be oriented relatively to channels 6 and prismatic elements 50 in any suitable way. In FIG. 12, sheet 2 is shown shaped in the form of a strip in which linear prismatic elements 50 extend perpendicular to a longitudinal axis of the strip. In FIG. 13, linear prismatic elements 50 are aligned parallel to such axis.

Figure 14:
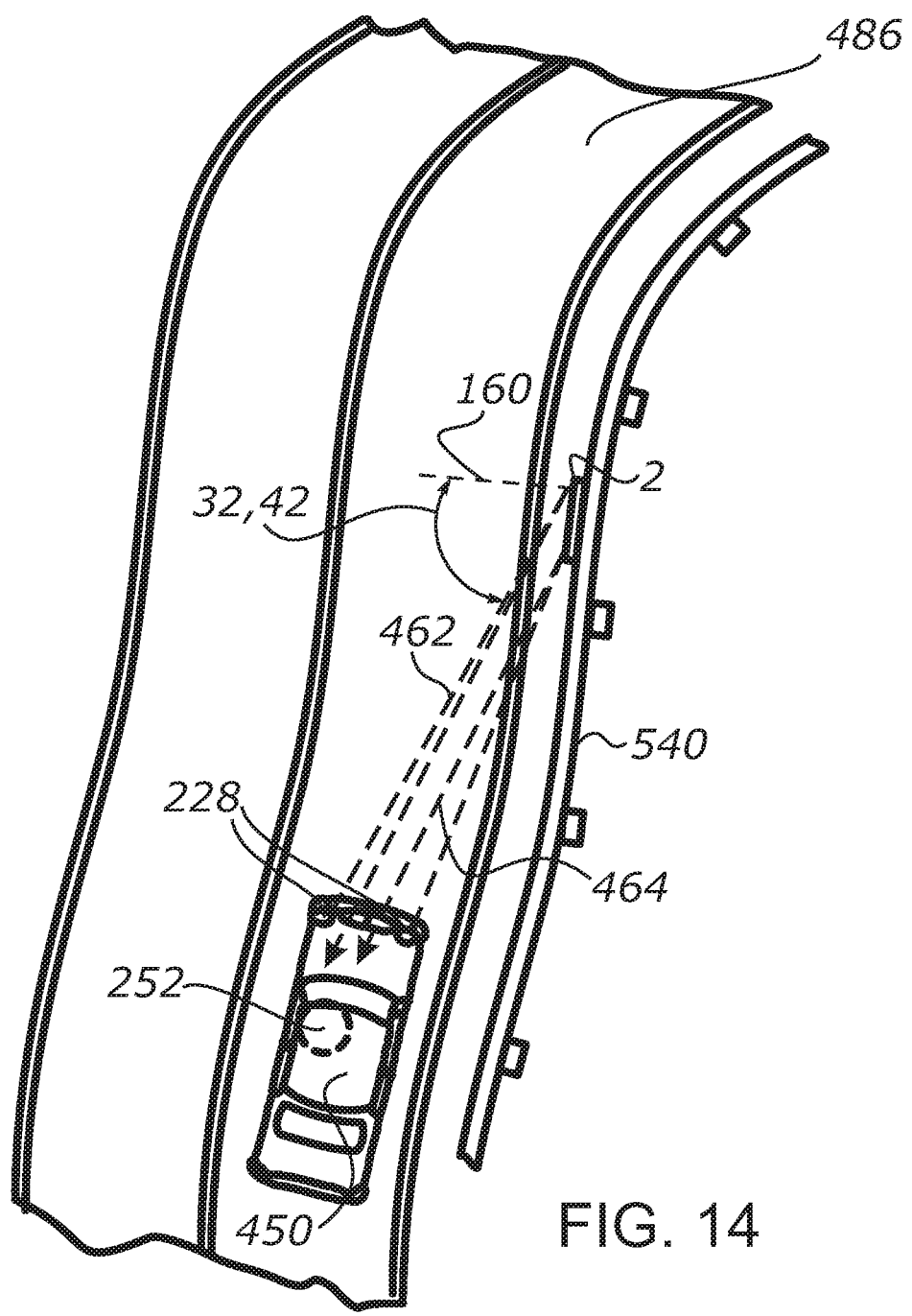
FIG. 14 is a schematic view showing an example of using a retroreflective sheeting for road marking, according to at least one embodiment of the present invention.

Such retroreflective strips can be used, for example, in high-conspicuity pavement or road structure markers. Particularly, a suitably shaped and dimensioned retroreflective strip can be adhered to or embedded into various roadside structures to enhance the conspicuity and visibility of the structures to the drivers of approaching cars. This is illustrated in FIG. 14 which depicts a strip of sheet 2 attached to a guard rail 540 extending along a road 486. A car 450 approaching the strip location illuminates sheet 2 by its headlights 228 at high incidence angle 32 with respect to normal 160.

Sheet 2 receives beams of light 462 and 464 from the left and right headlamps, respectively, and retroreflects each of the beams back towards the car with high efficiency and within a narrow cone including an area 252 where the car driver is located. Since sheet 2 can be particularly configured for high incidence angles, it can provide fairly high light output in the retroreflective operation despite the light receiving surface of the sheet being near parallel to the incident light beam. Accordingly, the illuminated strip of sheet 2 will appear bright to the car driver and the conspicuity and visibility of the guard rail 540 will thus be enhanced.

Figure 15:
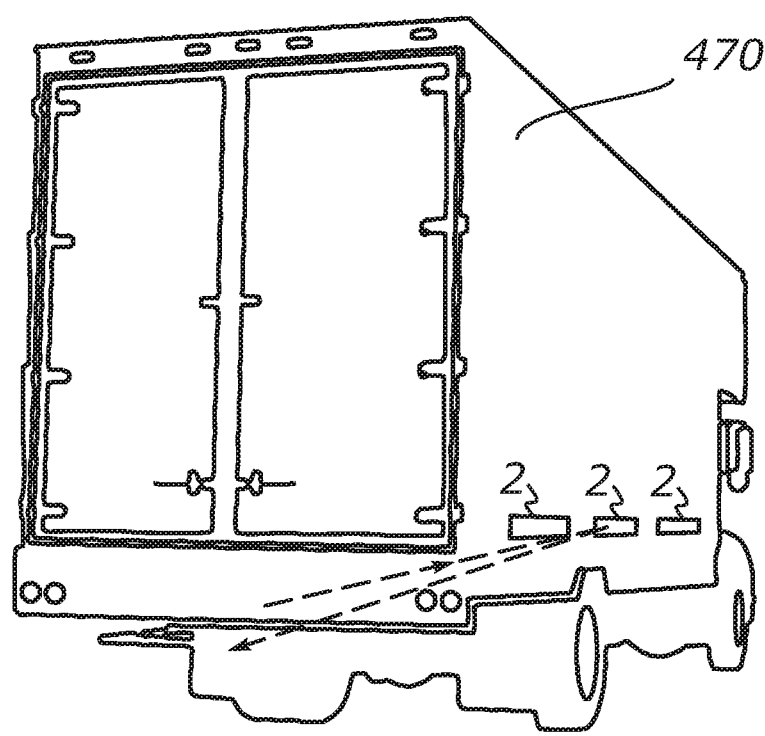
FIG. 15 is a schematic view showing an example of using a retroreflective sheeting for vehicular marking, according to at least one embodiment of the present invention.

FIG. 15 shows an example of incorporating retroreflective strips of sheet 2 material into the side trim of a truck 470. Such strips can be configured to retroreflect light back toward the source at high incidence angles, particularly including angles above 40° or so, and to appear bright to the drivers of passing cars who would normally view the sides of the truck at relatively sharp angles.

Figure 16:
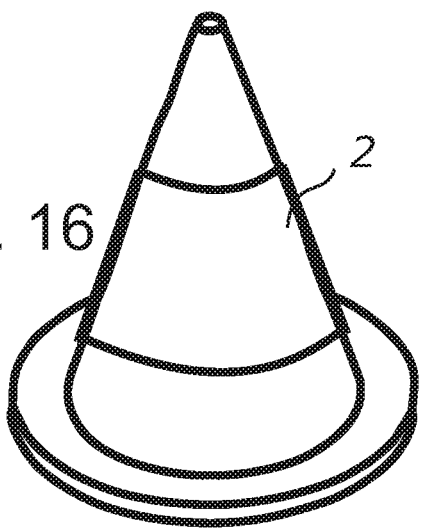
FIG. 16 is a schematic view of a retroreflective sheeting applied to a road warning cone, according to at least one embodiment of the present invention.
Figure 17:
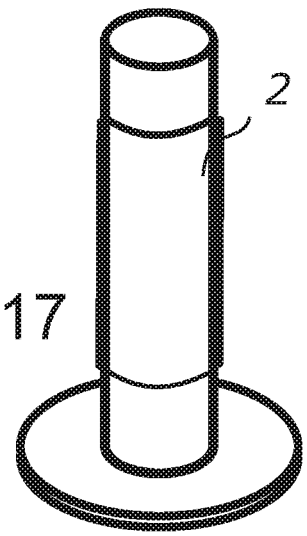
FIG. 17 is a schematic view of a retroreflective sheeting applied to a road marker pole, according to at least one embodiment of the present invention.

The retroreflective material of the present invention can also be used in pavement markers, road signs, emergence vehicle markers, road worker clothing marking, etc. Sheet 2 can be made flexible so that it could be wrapped around objects. In a more particular example, referring to FIG. 16, a strip of the retroreflective material of sheet 2 can be applied to a plastic or rubber road sign cone which is on roads under repair. In a further example shown in FIG. 17, sheet 2 is wrapped around a road marking pole while having the same basic structure and operation. Similarly, retroreflective strips of sheet 2 material can be attached to road-side poles or tree trunks to provide visually conspicuous marking of such objects.

When a conventional low-incidence-angle retroreflective material is used to mark a round object, only the central area of the wrapped-around strip is usually visible in a high brightness, while the peripheral left and right areas may appear dim due to the reduced retroreflectivity at high incidence angles. Accordingly, such conventional marking does not emphasize the dimensions of the round road-side structure. In contrast, the material of sheet 2 may be configured to maximize the retroreflectivity at high incidence angles, such as, for example, 60 to 85 degrees. Accordingly, when sheet 2 is used to mark a round object, the opposing sides of the visible strip area will appear in increased brightness, thus providing dimensional information on the object to the driver of an approaching vehicle. It is noted that sheet 2 configured for superior high-incidence-angle retroreflection will still provide at least some retroreflectivity even at relatively low incidence angles since at least a portion of light striking the entrance aperture of the sheet will be reflected not only by reflective layer 20 but also by channels 6. Therefore, the entire visible area of sheet 2 wrapped around an object may appear sufficiently bright to a car driver.

The retroreflective sheeting of the present invention may be adapted to disperse the retroreflected light within a predetermined range of directions in one or more angular dimensions. This may be useful, for example, to include the eyes of a car driver into the retroreflected light beam, considering that the light-emitting headlights and the driver's eyes are typically not on the same line of sight when viewed from the surface of sheet 2.

This may be accomplished by different means. In one embodiment, one of the layers or materials of sheet 2 may be provided with weak light scattering properties which would cause an increase in the divergence of the retroreflected light. In one embodiment, certain angular bias may be incorporated into various optical interfaces of sheet 2. For example, an angular bias may be added to walls 7 and/or 8 in the form of providing random slopes to such walls with respect to a normal to the surface of sheet 2 within a small predefined angular range (0.1°-2°). In another example, such angular bias may be implemented in the form of some surface waviness of walls 7 and 8.

A further alternative of increasing light output towards off-axis directions (at higher observation angles) may include providing controlled surface structure or haze for either one of surfaces 10, 12, 24 and 22 or any combination thereof. Such light-diffusing surface structure or haze can be introduced, for example, by chemical etching and/or electroplating of the tool surface used to produce the respective layers of sheet 2. For example, surface 10 may be textured with shallow microstructures to cause slight dispersion of the retroreflected beam.

In one embodiment, channels 6 can be made slightly curved in order to introduce controlled divergence into the retroreflected beam in an incidence plane, a plane which is orthogonal to the incidence plane, or both. Furthermore, it may be appreciated that the natural surface roughness of walls 7 and 8 resulting from the process of making channels 6 by means of material slitting using a blade may also result in some angular divergence of retroreflected rays which can be advantageously exploited to increase light output into directions other than the source direction.

Figure 18:
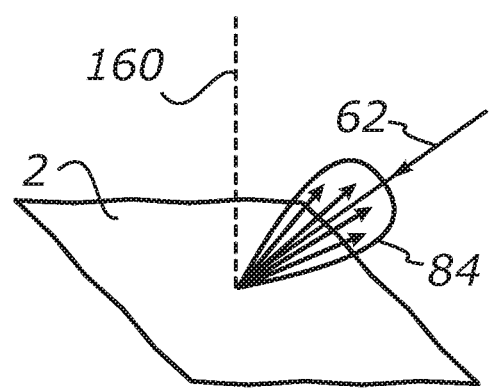
FIG. 18 is a schematic view of a retroreflective sheeting portion, showing a diverging beam of retroreflected light, according to at least one embodiment of the present invention.

Referring to FIG. 18, sheet 2 retroreflects incident ray 62 in the form of a divergent beam which is confined within a predetermined angular range 84. When sheet 2 is used for road signs or pavement marking, the angle of such divergent beam may be selected to advantageously encompass the angular size of the approaching vehicles in a range of useful distances from the sheet so that the drivers will be able to see the respective signs or markings in increased brightness.

Figure 19:
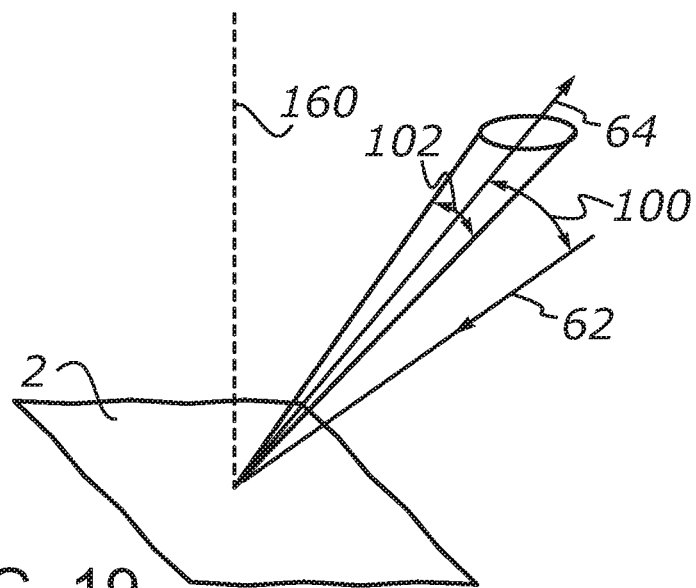
FIG. 19 is a schematic view of a retroreflective sheeting portion, showing a non-zero angle between an incident ray and a retroreflected ray, according to at least one embodiment of the present invention.

Sheet 2 may also be configured to retroreflect light with a predetermined angular offset with respect to the incident light direction. This is illustrated in FIG. 19 in which retroreflected ray 64 makes an angle 100 with respect to incident ray 62. In one embodiment, angle 100 can be made greater than an angle 102 of the divergence cone of the retroreflected light, as shown in FIG. 19.

The angular shift of the retroreflected beam (as defined by angle 100) can be enabled using different approaches. One approach is to make walls 7 and 8 of channels 6 slightly tilted with respect to a normal by a predefined small angle. It can be shown that the angle at which channels 6 should be tilted with respect to the "ideal" normal orientation to produce a desired angle 100 should be one half of angle 100. For example, in order to shift the retroreflected beam form the source direction by 1°, channels 6 should be tilted at a 0.5° angle with respect to a normal to sheet 2.

An angular shift of the retroreflected beam in an orthogonal angular dimension may be enabled by appropriately designing prismatic elements 50.

Figure 20:
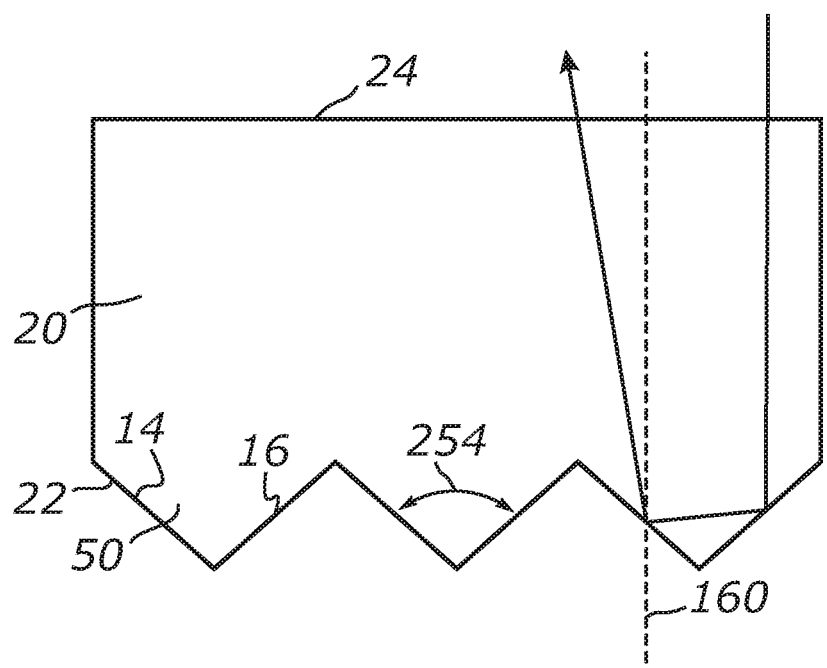
FIG. 20 is a schematic view and raytracing of a reflective layer portion, showing a retroreflected light deviating from an incidence direction, according to at least one embodiment of the present invention.

In one embodiment, an angle 254 between faces 14 and 16 can be made slightly lower or slightly greater than 90° to steer the retroreflected light away from the original propagation direction in a controlled fashion. This is illustrated in FIG. 20 which shows angle 254 being not exactly 90 degrees which causes the retroreflected ray to deviate from the direction of the respective incident ray.

Figure 21:
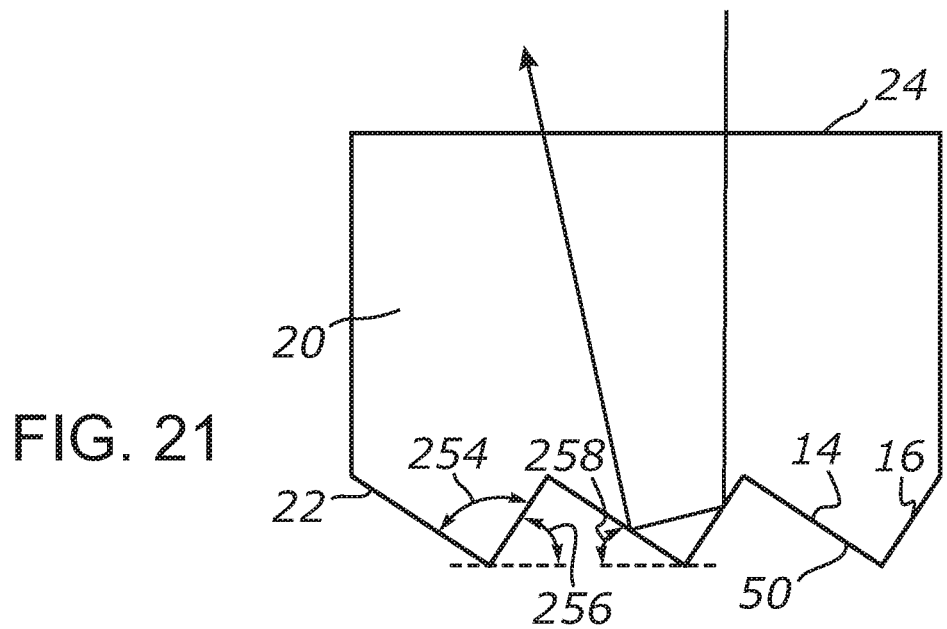
FIG. 21 is a schematic view and raytracing of a reflective layer portion, showing different dihedral angles of prismatic element faces with respect to a sheet surface, according to at least one embodiment of the present invention.

In one embodiment, prismatic elements 50 can be canted to either side by a predetermined angle so that their faces 14 and 16 will make different dihedral angles 256 and 258 to a prevailing plane or surface of sheet 2, which should also cause controlled deviation of the retroreflected rays from the source direction, as illustrated in FIG. 21.

Further modifications of the structure of sheet 2 may include selecting angular and/or dimensional parameters of the plurality of channels 6 or prismatic elements 50 so as to provide various dynamic visual effects and further enhance the conspicuity of the retroreflective sheeting. For example, in one embodiment, the L/D ratio characterizing the array of channels 6 may be selected to provide variable degree of retroreflectivity (and, hence, variable apparent brightness) as the observation angle of sheet 2 by a distant viewer changes. In an alternative embodiment, the dihedral angles 256 and 258 of faces 14 and 16 and/or angles 254 may be varied according to a predetermined pattern. For example, one or both of the dihedral angles 256 and 268 can be varied across the surface 22 in predetermined increments which can cause retroreflection of the incident light beam into a plurality of distinct directions. As the geometry of retroreflection changes for a moving observer and/or a light source (such as is the case of a car or truck driver and headlights moving with respect to a road sign or marking), the observer may see sheet 2 in variable brightness.

Figure 22:
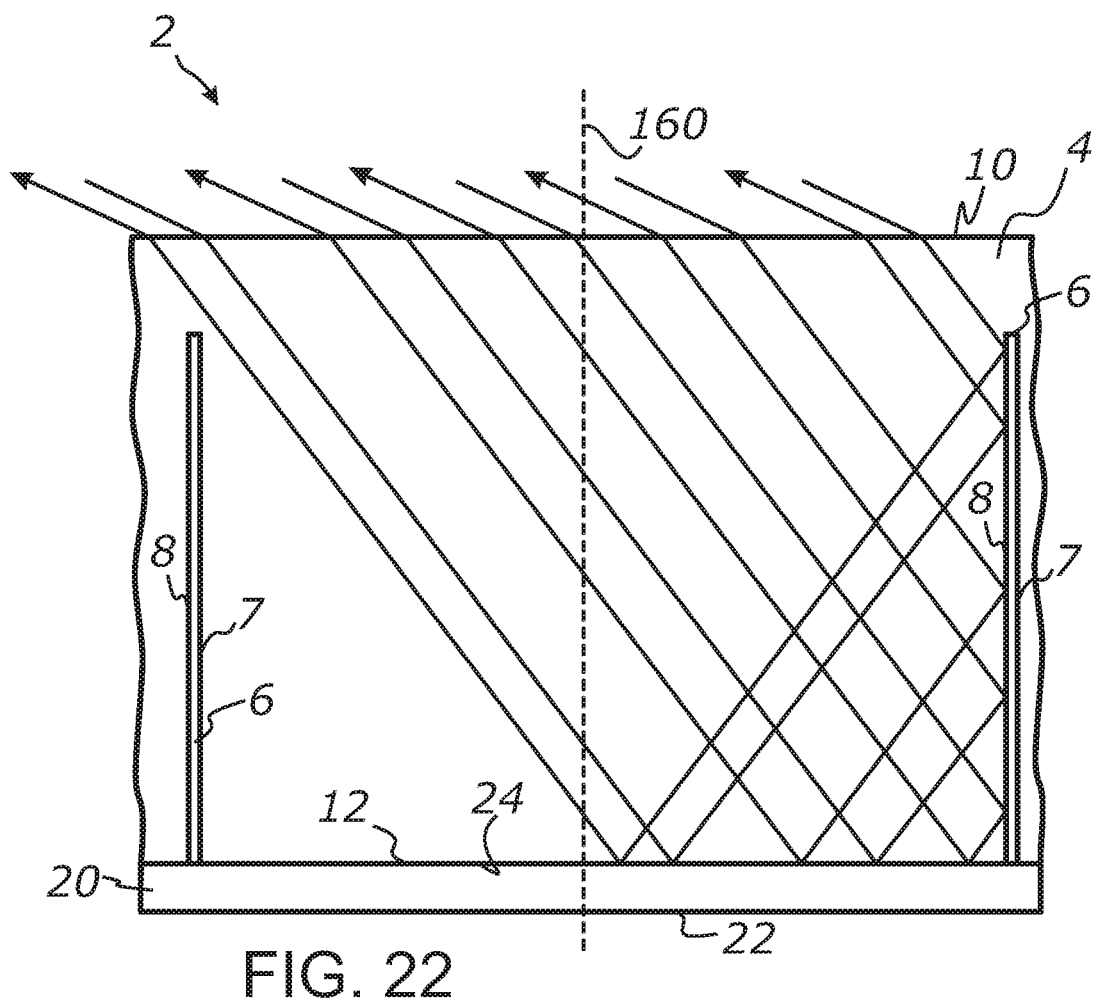
FIG. 22 is a schematic fragmentary view and raytracing of a retroreflective sheeting, showing a plurality of rays retroreflected toward a source direction, according to at least one embodiment of the present invention.

It is noted that the retroreflective sheet material described in the foregoing embodiments may be configured to return almost 100% of the incident light back towards the source. This is illustrated in FIG. 22 which shows an individual retroreflective cell formed by a pair of adjacent channels 6 and a portion of reflective bottom layer 20 underneath. A plurality of high-incidence-angle light rays are distributed over an area of surface 10 which is roughly equivalent to the entrance aperture of the retroreflective cell formed by the adjacent channels 6 of the top layer 4 and the reflective surface 24 of the bottom layer 20.

The illustrated example corresponds to an L/D ratio of about 1.5, a refractive index of layer 4 of about 1.51 and an incidence angle of approximately 65° (25° angle with respect to surface 10). As it can be seen, at such an incidence angle, sheet 2 orientation with respect to a light source, and channels 6 depth and spacing, each of the light rays incident onto surface 10 of sheet 2 is retroreflected and returned toward the source direction. Since light rays of FIG. 22 cover practically the entire light receiving aperture of the retroreflective cell, substantially all of the light incident onto such aperture will be retroreflected.

It will be appreciated that, in practice, the actual retroreflection efficiency will be lower than 100% due to a number of factors, such as the Fresnel reflection from surface 10, light absorption or scattering in the transmissive materials of sheet 2 and manufacturing imperfections. If layer 20 comprises a specular material, the reflectivity of such material will also be factored into the resulting light output efficiency. Accordingly, as a practical consideration, it may be possible to design the retroreflective sheeting of the present invention to return above 90% of light toward the source at least at optimal incidence angles. In one embodiment, sheet 2 may be configured to retroreflect more than 60% of the incident light at an optimal incidence angle or within a range of incidence angles approximating the optimal incidence angle. In one embodiment, sheet 2 may be configured to retroreflect at least 75% of the incident light.

It is noted that, while the retroreflective sheeting of the present invention is primarily designed to provide enhanced retroreflectivity at high incidence angles and specific orientations with respect to the light source, it is also operable to provide retrorectivity at lower incidence angles and other orientations. For example, it can be shown that the structure of sheet 2 will reflect essentially all of the normal-incidence light back towards the source. It can also be shown that, at relatively low incidence angles, the retroreflective sheet 2 structure of FIG. 7 will retroreflect at least a portion of the incident light.

The retroreflection efficiency off sheet 2 at lower incidence angles may be increased by lowering the L/D ratio. Accordingly, by varying the L/D ratio, the structure of retroreflective sheeting may be optimized for a specific angular range.

Figure 23:
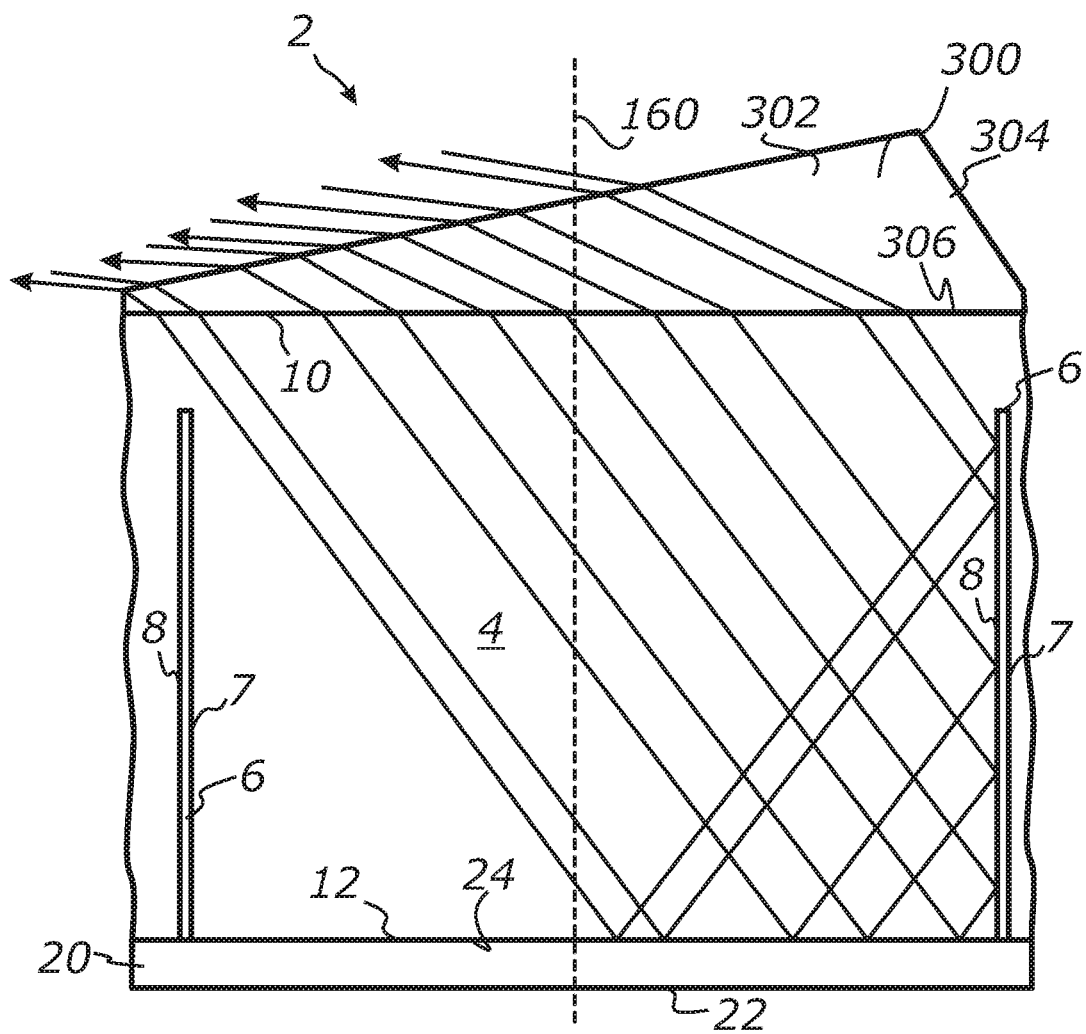
FIG. 23 is a schematic fragmentary view and raytracing of a retroreflective sheeting, showing a refractive prismatic element configured to bend high-incidence-angle light rays, according to at least one embodiment of the present invention.

FIG. 23 illustrates an embodiment of retroreflective sheeting 2 which is similar to that shown in FIG. 22 but which further includes a prismatic layer on top of layer 4. Such prismatic layer can be formed by a plurality of prismatic elements 300 distributed over the surface of sheet 2. An individual prismatic element 300 is illustrated in FIG. 23. Such prismatic element 300 is formed by an asymmetric triangular prism defined by faces 302, 304 and 306 and is made from an optically transmissive polymeric material.

Face 302 is configured for receiving light from directions that represent extremely high incidence angles, including the case when the incident rays propagate parallel or near parallel to the prevailing plane of sheet 2. In operation, face 302 intercepts such extremely high incidence angle rays and refract them light into the body of layer 4. As a matter of optics, a sloped orientation of face 302 reduces Fresnel reflections from sheet 2 compared to the case when sheet 2 has a planar outer surface and directs the received light rays at angles more favorable for high-efficiency retroreflection. For the described operation, sheet 2 may need to be oriented such that faces 302 of the respective prismatic elements 300 are facing the expected light source direction. Possible variations of prismatic elements 300 may include various base angles (dihedral angles that said faces form with surface 10 or the prevailing plane of sheet 2) of faces 302 and 304 as well as symmetrical configurations in which faces 302 and 304 form the same base angle and can receive high-incidence-angle light on either one or both faces.

The top prismatic layer including prismatic elements 300 may be formed by a sheet-form prism array molded or extruded on a flexible film substrate or directly on surface 10. Alternatively, prismatic elements 300 may be formed directly in the material of layer 4.

Sheet 2 may be configured to include areas in which portions of retroreflective sheeting are disposed in different orientation with respect to each other. This may be useful, for example, for providing an omnidirectional retroreflective device.

Figure 24:
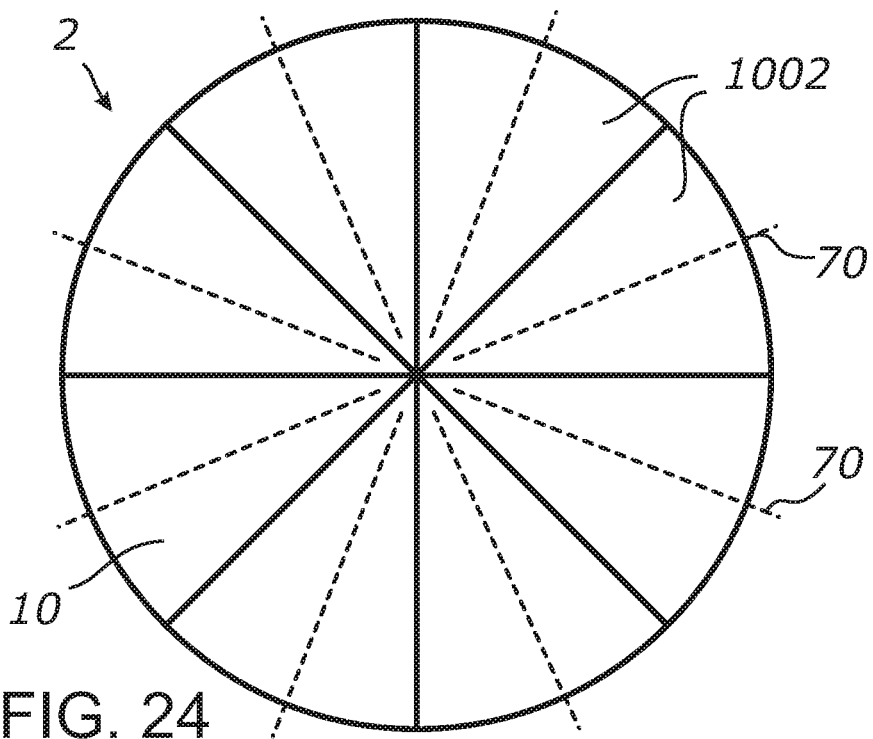
FIG. 24 is a schematic top view of an omnidirectional retroreflective sheeting, according to at least one embodiment of the present invention.

One embodiment of omnidirectional retroreflective sheeting is illustrated in FIG. 24 in which a circular sheet 2 includes eight identical segments 1002 being a rotated copy of an adjacent segment. Each segment 1002 has channels 6 aligned perpendicular to a radius of the circle (reference lines 70 of the respective segments are aligned along the radius) covering the entire 360° angular range of the circle. It may be appreciated that, when each segment is configured for an azimuth acceptance angle of about 30° and elevation acceptance angle of 0°-90°, at least one of such segments will always operate at the prescribed acceptance angle range. Accordingly, at least 15% of the area of sheet 2 will efficiently retroreflect light regardless of the incidence angle, thus providing omnidirectional operation.

Furthermore, sheet 2 may also be operated together with conventional retroreflectors, e.g., those based on cube corners, full-cubes or glass beads. In one embodiment, sheet 2 may be optimized for high incidence angles and include areas which comprise such other types of retroreflectors designed to efficiently retroreflect light incident at low, normal or near-normal angles. In one embodiment, the retroreflective sheeting of this invention may be alternated with such conventional retroreflective sheeting to provide a full angular coverage (incidence angles from 0 to almost 90°).

Figure 25:
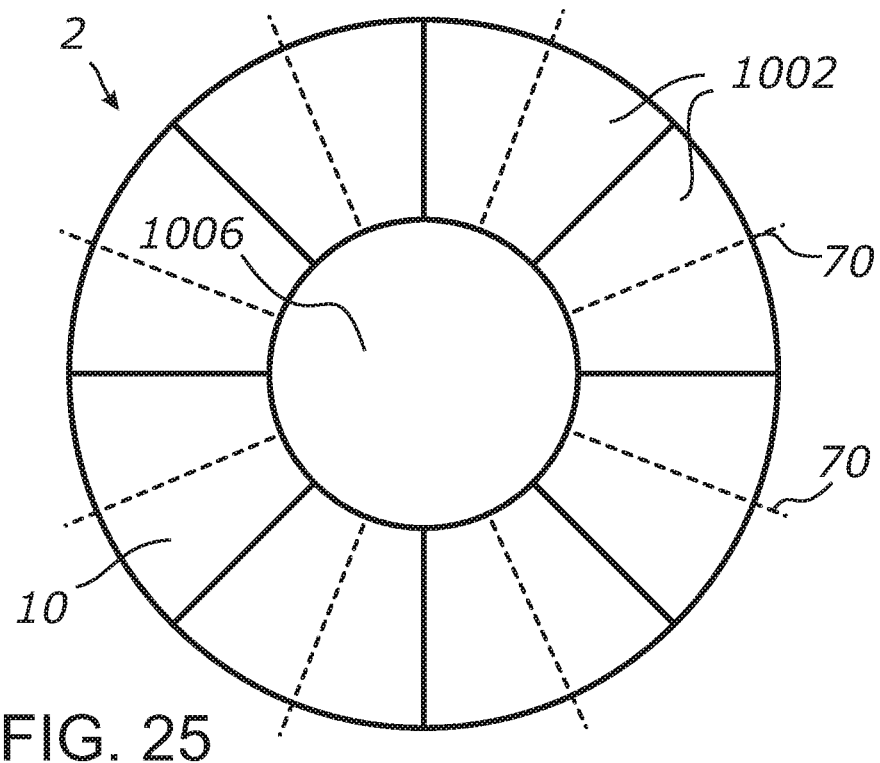
FIG. 25 is a schematic top view of an alternative configuration of an omnidirectional retroreflective sheeting, according to at least one embodiment of the present invention.

An alternative configuration of omnidirectional retroreflective sheeting is shown in FIG. 25 which further includes a central area 1006 formed by a conventional cube-corner or full-cube retroreflective material configured for high-efficiency retroreflection at low incidence angles. Accordingly, the omnidirectional structure of FIG. 25 may exhibit fairly high retroreflective efficiency for the entire 0°-90° range of incidence angles.

Figure 26:
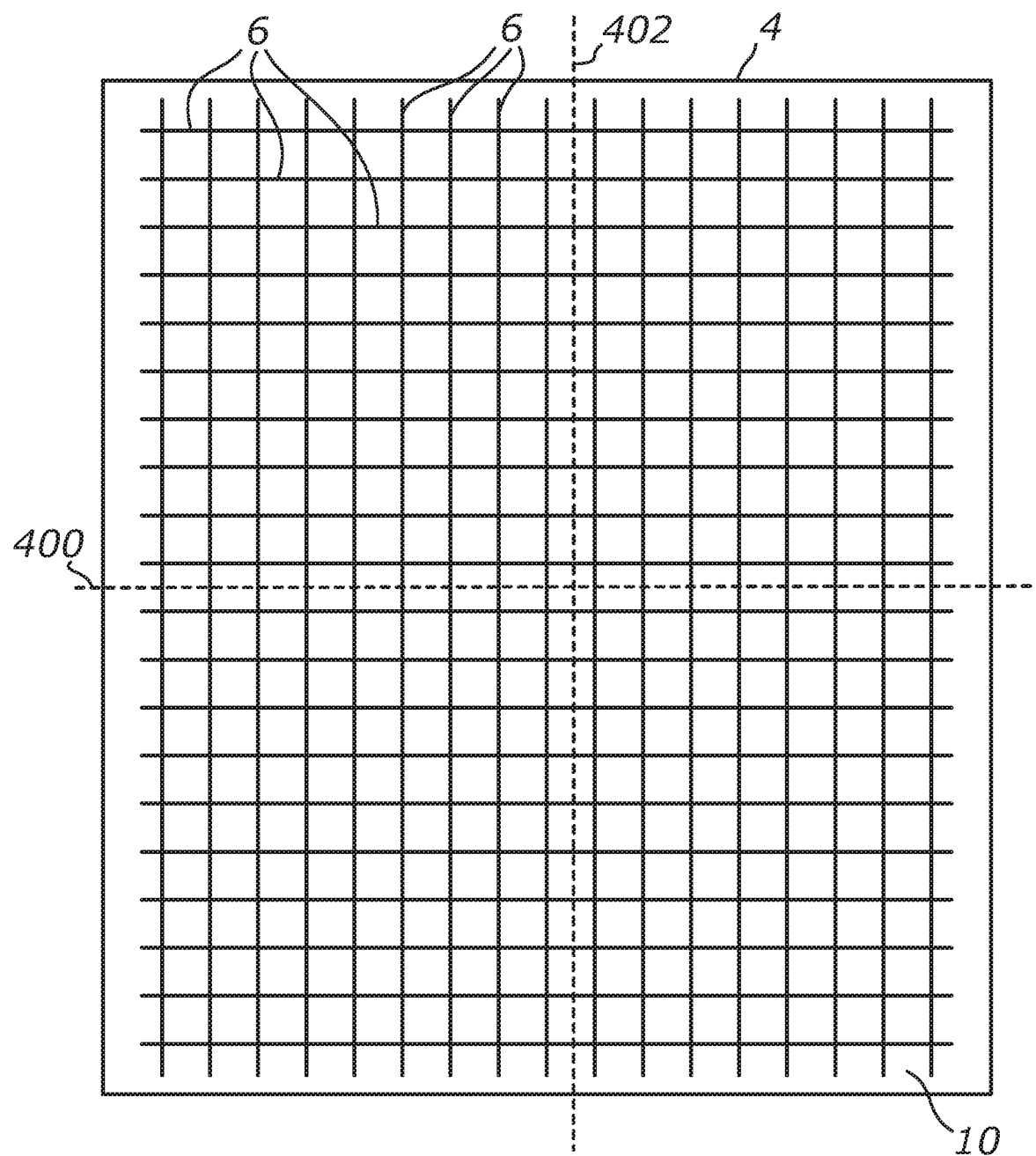
FIG. 26 is a schematic top view of an optically transmissive layer, showing a plurality of linear channels arranged into two parallel arrays crossed at a right angle with respect to each other, according to at least one embodiment of the present invention.
Figure 27:
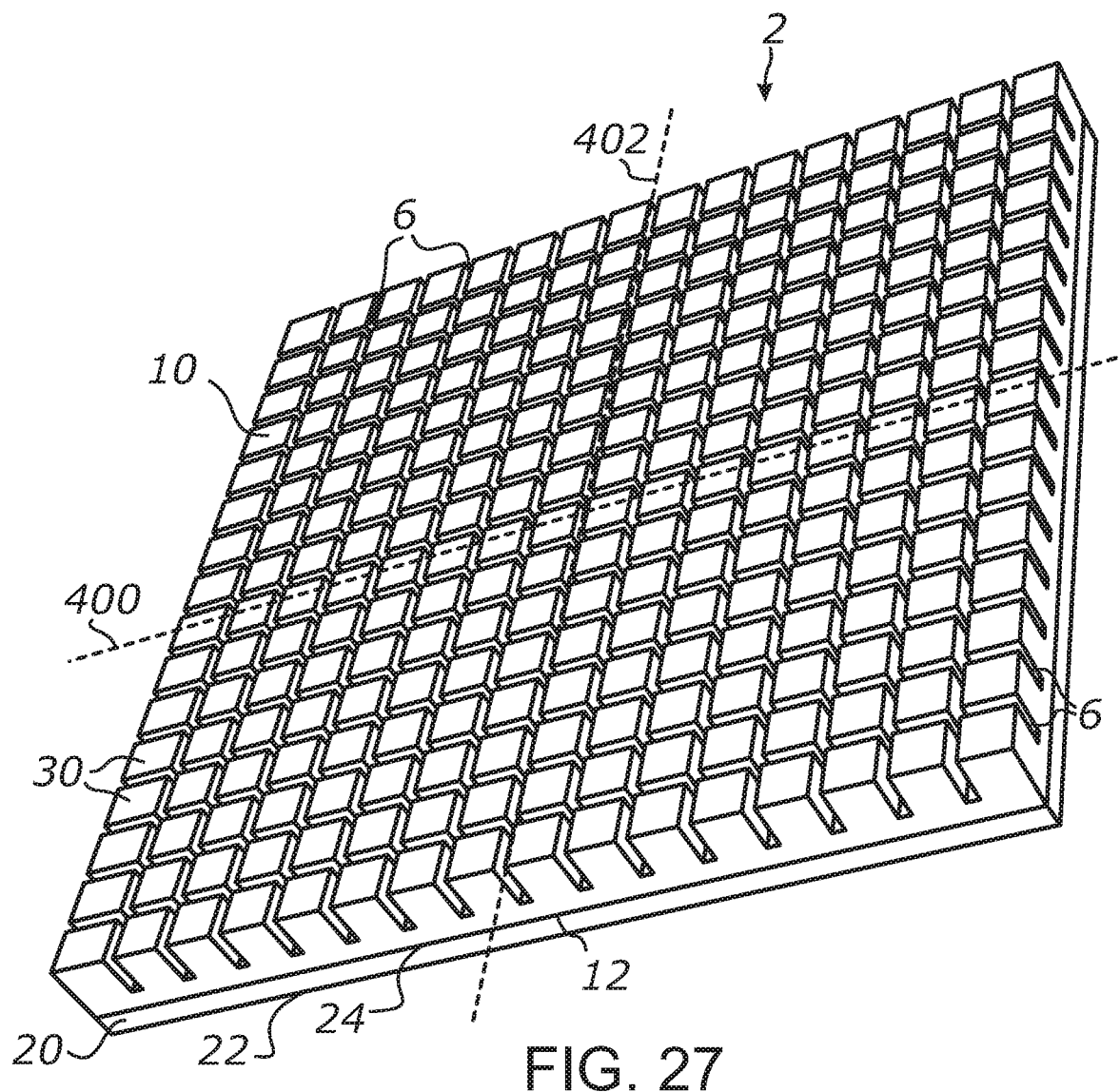
FIG. 27 is a schematic perspective view of a retroreflective sheeting, showing a plurality of intersecting linear channels formed in a top transmissive layer, according to at least one embodiment of the present invention.

FIG. 26 shows an embodiment of retroreflective sheeting 2 in which layer 4 includes a second array of parallel channels 6 extending generally perpendicular to the channels 6 of the first array. Such perpendicular arrays of channels 6 may be formed in the same surface of layer 4, as shown in FIG. 27. Alternatively, layer 4 may be formed by two or more sub-layers superimposed on one another and the respective arrays of channels 6 may be formed in those sub-layers.

It will be appreciated that sheet 2 having layer 4 with two perpendicular arrays of channels 6 may be used for retroreflecting light in two orthogonal angular dimensions using smooth-surface specularly reflective layer 20 and without using surface corrugations such as triangular prismatic elements 50.

Referring to FIG. 27, the perpendicular grid of channels 6 formed by the intersecting arrays essentially forms a plurality of light-channeling cells. Both of the arrays of channels 6 are shown to be formed in surface 10. However, it should be understood that such intersecting channels arrays may also be formed in surface 12. Each light-channeling cell will have a shape of rectangular parallelepiped defined by four vertical walls of intersecting channels 6 and a horizontal terminal wall represented by an uncut portion of surface 10. When such top layer 4 is coupled to specularly reflective bottom layer 20, as further shown in FIG. 27, and with the appropriate dimensioning of channels 6, each light channeling cell can have retroreflective properties. In other words, each light channeling cells coupled to the reflective layer 20 forms a full-cube retroreflective cell 30.

Figure 28:
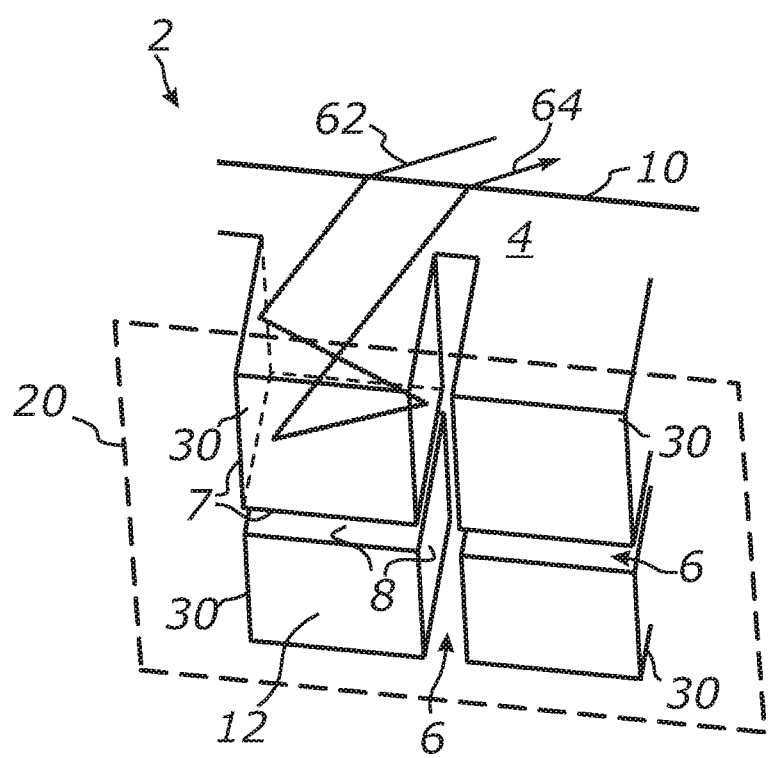
FIG. 28 is a schematic fragmentary perspective bottom view and raytracing of an optically transmissive layer, showing individual full-cube retroreflective cells formed by a plurality of intersecting linear channels, according to at least one embodiment of the present invention.

The operation of full-cube retroreflective cells 30 is illustrated in FIG. 28 for a case where channels 6 are formed in surface 12 and surface 10 is made smooth. Off-normal incident ray 62 entering one of the cells 30 undergoes two reflections from a pair of adjacent orthogonal faces of the cell, which also form TIR walls 7 and/or 8, and from a mirrored surface of reflective layer 20 which is perpendicular to both of the orthogonal faces. Accordingly, it can be shown that at such rectangular geometry of reflection, ray 62 emerges from cell 30 as retroreflected ray 64 and propagates back to toward the source. Accordingly, the structure of sheet 2 of FIG. 28 represents an alternative full-cube retroreflective sheeting structure which can efficiently retroreflect light, particularly at high angles of incidence (high entrance angles).

The retroreflective sheeting of this invention can be used for light rejection in which case sheet 2 may be configured to retroreflect at least a portion of light incident from an unwanted range of directions. Such configuration of retroreflective sheeting may find utility in various daylight control devices such as window blinds or louvers.

For example, a strip of light directing material having the structure of sheet 2 may be incorporated into horizontal venetian blind structure or into a vane of a horizontal louver system. One or more slats of the horizontal blinds may be formed by a strip-shaped sheet 2 where each channel 6 extends parallel to the longitudinal dimension of the strip. Such horizontal slat may have notches formed at least the ends of the respective strip for passing a support cord through them and can also be operable by a manual or automatic position control mechanism that allows for changing the angle or position of the slat and thus varying the amount of transmitted and/or rejected light.

Figure 29:
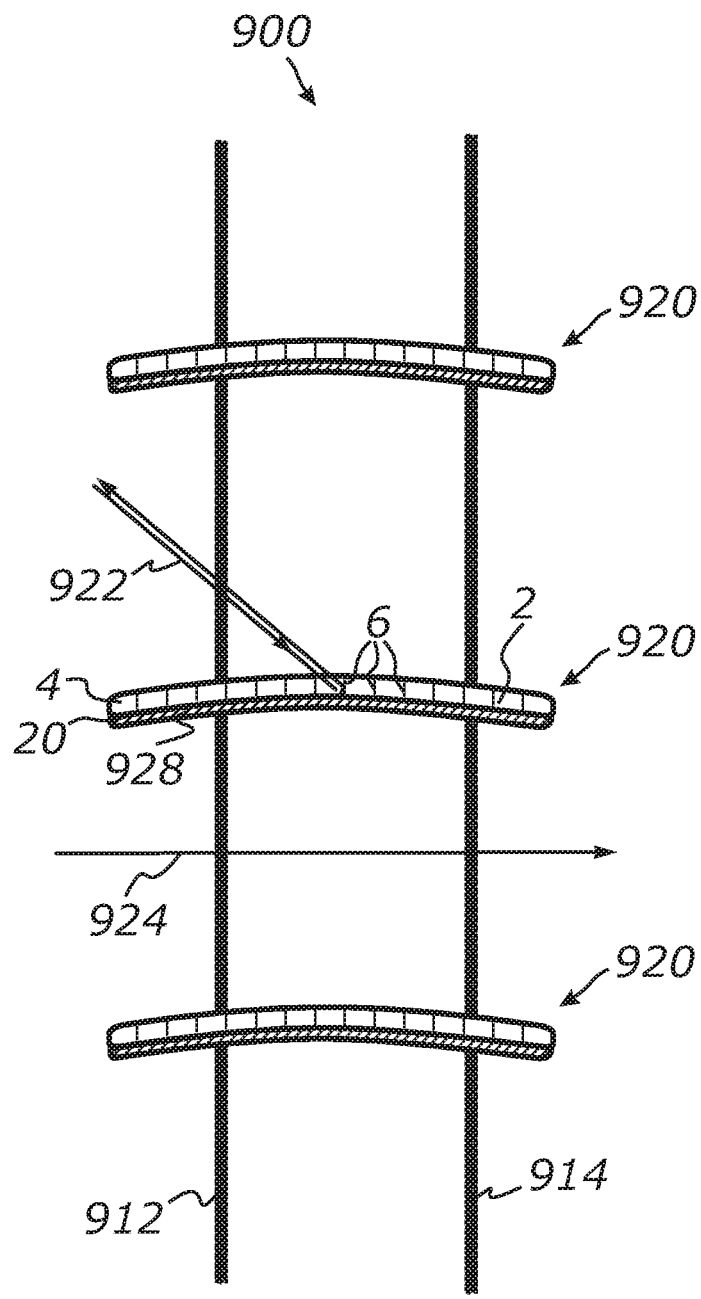
FIG. 29 is a schematic fragmentary view of a horizontal window blind employing retroreflective sheeting, showing a plurality of adjustable light deflecting slats in a fully open position, according to at least one embodiment of the present invention.

An embodiment of a horizontal window blind structure 900 is illustrated in FIG. 29 which shows three venetian blind slats 920 adjustably operable by cords 912 and 914. Each of slats 920 has a slightly curved shape for structural rigidity and includes a light redirecting structure of retroreflective sheet 2 attached to a rigid substrate layer 928. Depending on the orientation of slats 920, window blind structure 900 may be configured to reject various amounts of sunlight and prevent the associated heat from entering a building interior. Substrate layer 928 is optional and may conventionally include materials and structures used in window louvers and blinds, such as for example, natural wood, faux wood, vinyl, sheet metal and the like.

As shown in FIG. 29, when slats 920 are in a fully open position, a light ray 922 exemplifying a beam of direct sunlight strikes one of the slats 920 and is redirected back towards the exterior of a building by the retroreflective structure of sheet 2. The retroreflective operation is provided by the reflection of ray 922 from one of the channels 6 using TIR and from the bottom reflective layer 20. Layer 20 can be configured to include a mirrored surface in which case it will reflect light by means of a specular reflection. Alternatively, layer 20 can be provided with a microprismatic surface, such as that shown in FIG. 7, in which case it will reflect light by means of TIR from the respective faces of the micro prisms.

Accordingly, such operation of blind structure 900 may be useful for rejecting at least a portion of the solar beam and thus reducing the heat gain and glare associated with direct sunlight. It is noted that, unlike the conventional window blinds that can only block solar heat by also blocking the view, window blind structure 900 may achieve similar solar heat rejection results while essentially preserving the view. This is illustrated by the unimpeded path of a ray 924 exemplifying diffuse light incident into the building interior from various outdoor objects.

At an optimal orientation of slats 920, window blind structure 900 can potentially reject substantially all of the direct daylight and the heat associated with the direct solar beam. It may be appreciated that a relatively small portion of the direct solar beam intercepted by slats 920 may still reach the building interior even at an optimal orientation and spacing of slats 920. For example, some light (~4%) can be reflected through Fresnel reflection from the top surface of sheet 2.

At non-optimal slat orientations, the fraction of admitted light may increase due to an increased fraction of light which is not intercepted by slats 920 or channels 6 in each slat. This can essentially provide means for controlling the light and heat throughput of the blinds by manually adjusting their orientation. In one embodiment, window blind structure may be motorized and optionally provided with an automated daylight control system. Such automated system can be made operable in response to the availability and amount of the direct sunlight at the window and can be configured to open, close or rotate slats 920 to various intermediate angular positions for maintaining a prescribed lighting level or maximizing heat rejection.

In some cases, it may be desired that the admitted portion of direct sunlight is diffused in order to avoid glare or sharp shadows in the interior. Accordingly, in one embodiment, one or more surfaces or optical interfaces of sheet 2 may be provided with light diffusing features, such as surface texture. For example surface 10 may be patterned with light matte finish to spread light reflected from slat 920 across a wider angular range.

Figure 30:
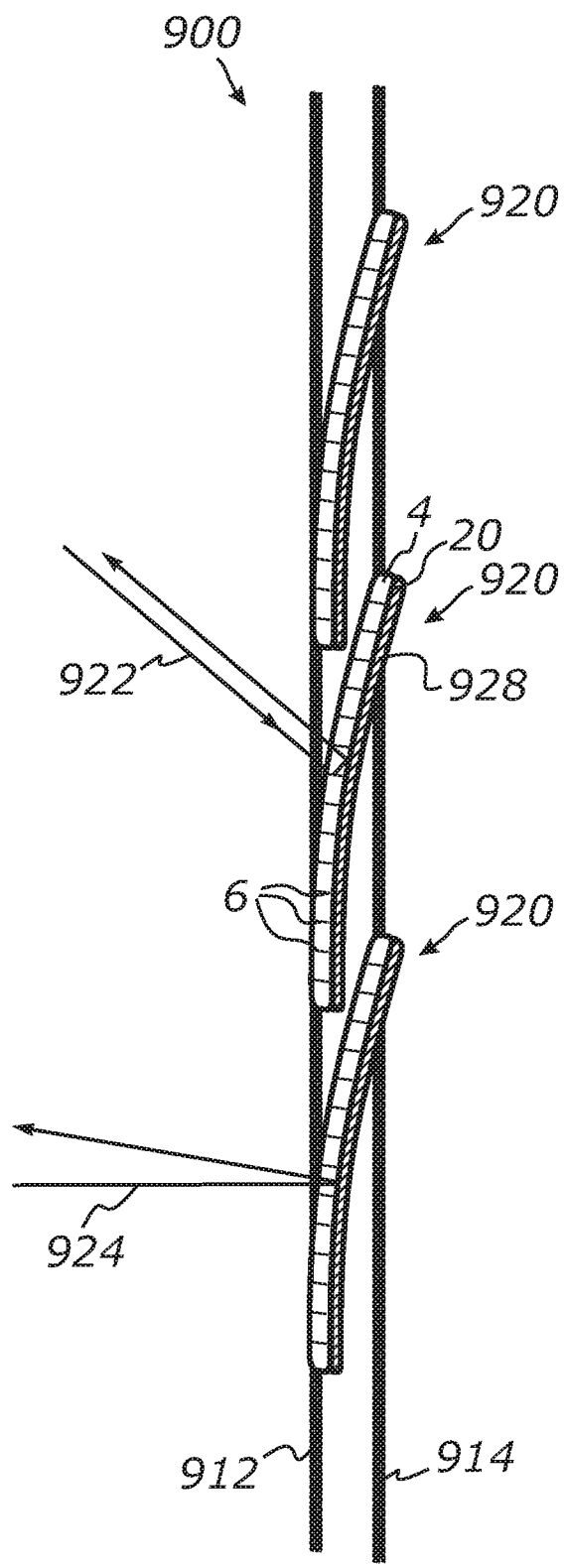
FIG. 30 is a schematic fragmentary view of a horizontal window blind employing retroreflective sheeting, showing a plurality of adjustable light deflecting slats in a fully closed position, according to at least one embodiment of the present invention.

When slats 920 are in a fully closed position (FIG. 30), both the direct and diffuse sunlight components are rejected, as shown by the paths of rays 922 and 924. It will be appreciated that slats 920 may be adjusted to any intermediate angular orientation between the fully open and fully closed position in which case the amount of rejected and/or admitted light can be controlled for almost any solar elevation. It is further noted that, by adjusting the angular position of slats 920, the angular direction of the admitted daylight may also be varied in a broad range. This can be useful, for example, for illuminating deep portions of the building interior by steering such redirected light farther away from the window while rejecting most of the heat associated with the direct solar beam. The light diffusing finish of surface 10 may also include various decorative finishes or ornamental patterns. It is noted that blind structure 900 may be configured so that slats 920 can be rotated almost 360 angular degrees and either retroreflective or the opposing non-retroreflective surfaces of the slats may be exposed to the incident sunlight. When the non-retroreflective sides of slats 920 are exposed to the incident sunlight by facing towards the outside of the building, window blind structure 900 may operate simply as a shading device, similarly to the conventional venetian blinds.

The appearance of sheet 2 may be configured in a number of ways. For instance, a pigment may be added to one or more of its materials thus altering the color or transparency. In applications requiring improved conspicuity, sheet 2 may be provided with a visually conspicuous color or tint. To provide a certain color to sheet 2, a dye or pigment may be incorporated in the resin used to form layer 4, layer 20 or any other auxiliary layer or coating that can be added to sheet 2. Also, sheet 2 may include any suitable image, pattern or print which can be formed on surface 10 or embedded into the structure of the sheet. Such print may be produced, for example, using thermal transfer printing, screen printing, ink jet printing, and the like.

EXAMPLE 1

A retroreflective sheet-form structure as schematically illustrated in FIG. 7 was made by attaching a top optically transmissive layer formed by a 1-millimeter-thick sheet of optically clear thermoplastic polyurethane (TPU) to a bottom reflective layer formed by a same-sized sheet of brightness enhancement film BEF II 90/24 commercially available from 3M Corporation and having a thickness of about 140 μm (5.5 mils). The BEF II 90/24 film product has a microprismatic surface structure formed by an array of right-angle isosceles microprisms having a linear configuration and prism pitch of about 24 μm (0.9 mils).

An array of parallel TIR micro-channels was formed in the top layer by slitting a surface of the TPU sheet material to a cutting depth of approximately 500 μm using a pack of sharp rotary blades commercially available from KAI Corporation. The micro-channels were formed at a constant spacing of about 600 μm so that the L/D ratio characterizing the channels was about 1.2. In laboratory measurements of the surface roughness of the TIR walls of the micro-channels have indicated that the root-mean-square (RMS) roughness parameter of such walls 7 and 8 was between 0.01 micrometers (10 nanometers) and 0.03 micrometers (30 nanometers).

The top and bottom layers were oriented relatively to each other such that the channels of the top layer were aligned perpendicular to the linear microprisms of the bottom layer, the cut surface of the top layer was facing the bottom layer, and the microprisms of the bottom layer were facing away from the formed retroreflective sheet structure.

The formed retroreflective sheet structure was then tested during night time in lights of an approaching vehicle. In a first type of tests, the retroreflective structure was attached to rigid board and disposed along a roadside in various orientations with respect to a direction to the approaching vehicle to simulate various types of road markings and their observation conditions. In a second type of tests, the retroreflective sheet structure was wrapped around a cylindrical pole to simulate retroreflective roadside markings of round objects.

In such tests, the retroreflective sheeting had a very high apparent brightness (when viewed by a driver of the approaching vehicle) in a broad range of incidence (entrance) and observation angles. When compared side-by-side to various types of commercially available retroreflective sheeting, the new retroreflective structure had a markedly brighter appearance than any of the other tested sheeting (which included ASTM retroreflective sheeting of Types I through XI) at least at entrance angles exceeding 30-40° and also exceeded in brightness most of the tested products at lower entrance angles.

EXAMPLE 2

A retroreflective sheet-form structure as was made as described in EXAMPLE 1 above except that the top layer was made from optically clear plasticized polyvinyl chloride (flexible polyvinyl film). The tests were conducted as described in EXAMPLE 1 above and have shown similar results.

EXAMPLE 3

A retroreflective sheet-form structure as schematically illustrated in FIG. 3 was made by a top optically transmissive layer formed by a 0.5-millimeter-thick sheet of optically clear thermoplastic polyurethane (TPU) and attaching it to a bottom reflective layer formed by a metalized polyethylene terephthalate (Mylar®) film. The top layer included an array of parallel TIR micro-channels formed as described in EXAMPLE 1 above and spaced/dimensioned at 1.4 L/D ratio.

The bottom layer was provided with a high-tack adhesive that was used to attach the retroreflective sheet-form structure to a thin and rigid sheet-form substrate. A strip of approximately 4 centimeters by 50 centimeters of the resulting sheet-form retroreflective structure was cut out such that the longitudinal axis of the strip was parallel to the longitudinal axis of the micro-channels formed in the top layer. The resulting strip was tested by exposing it to a parallel beam of light and measuring its reflectance at different incidence angles and orientations. The tests have shown a strong, angularly-selective retroreflection in a plane perpendicular to the longitudinal axis of the strip, particularly at angles exceeding 40-45°.

EXAMPLE 4

A retroreflective sheet-form structure as schematically illustrated in FIG. 27 was made by a top layer of clear and flexible PVC attached to a similarly-sized sheet of Mylar® material. The top layer had a thickness of about 0.8 mm and included two parallel arrays of micro-channels disposed perpendicular to each other. The perpendicular arrays of micro-channels were formed by slitting a surface of the top layer along the respective perpendicular directions using a tightly packed assembly of rotary blades. The channel depth D was about 450 μm and the channel spacing was about 550 μm for both arrays. In laboratory tests, the resulting sheeting had high retroreflection efficiency for a broad range of off-axis incidence angles.

Further details of the structure and operation of retroreflective sheeting of the invention, as shown in the drawing figures, as well as their possible variations will be apparent from the foregoing description of preferred embodiments. Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A retroreflective article, comprising:
    a flexible sheet-form structure having a thickness between 100 micrometers and 2 millimeters and comprising a top sheet of an optically transmissive material and a bottom sheet of an optically transmissive material attached to a bottom surface of the top sheet;
    a plurality of parallel channels formed in the top sheet and each having a pair of opposing parallel walls extending perpendicular to the bottom surface of the top sheet, wherein at least one of the opposing parallel walls defines a surface configured to reflect light using a total internal reflection; and a parallel array of prismatic ridges formed in a bottom surface of the bottom sheet and oriented perpendicular to said plurality of parallel channels, each of the prismatic ridges defining two walls intersecting at a right angle with each other.

2. A retroreflective article as recited in claim 1, wherein at least one of said parallel walls has a root mean square surface profile roughness parameter of at least 10 nanometers and equal to or less than 60 nanometers at a sampling length between 20 and 100 micrometers and is configured to reflect light by means of a total internal reflection.

3. A retroreflective article as recited in claim 1, wherein a surface of at least one of the prismatic ridges has a mirror coating configured to reflect light by means of a specular reflection.

4. A retroreflective article as recited in claim 1, wherein a top surface of the top sheet has a light diffusing texture configured to disperse a parallel beam of light within a predetermined range of directions.

5. A retroreflective article as recited in claim 1, wherein the optically transmissive material of the top sheet comprises plasticized polyvinyl chloride.

6. A retroreflective article as recited in claim 1, wherein said parallel channels are configured at a spacing distance L and a depth D which are bounded by a relation $$\frac{L}{D} < \frac{2}{\sqrt{n^2 - 1}}$$

in which n is a refractive index of the optically transmissive material of the top sheet.

7. A retroreflective article as recited in claim 1, wherein the parallel channels are spaced apart from each other by a distance that is 1.5 times greater than a depth of the parallel channels, wherein said depth is at least 5 times greater than a height of the prismatic ridges, and wherein said distance is at least 6 times an average width of the channels.

8. A retroreflective article as recited in claim 1, wherein a thickness of the top sheet is between 100 micrometers and 1 millimeter.

* * * * *